(12) United States Patent
Li et al.

(10) Patent No.: US 12,513,489 B2
(45) Date of Patent: Dec. 30, 2025

(54) POSITIONING CONFIGURATION METHOD AND ELECTRONIC DEVICE

(71) Applicant: Samsung Electronics Co., Ltd., Suwon-si (KR)

(72) Inventors: Lisi Li, Beijing (CN); Lixiang Xu, Beijing (CN); Hong Wang, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 17/661,504

(22) Filed: Apr. 29, 2022

(65) Prior Publication Data

US 2022/0353636 A1 Nov. 3, 2022

(30) Foreign Application Priority Data

Apr. 30, 2021 (CN) .......................... 202110482534.2
May 17, 2021 (CN) .......................... 202110534367.1
Dec. 23, 2021 (CN) .......................... 202111591924.X

(51) Int. Cl.
*H04W 4/029* (2018.01)
*H04L 5/00* (2006.01)
(52) U.S. Cl.
CPC ........... *H04W 4/029* (2018.02); *H04L 5/0048* (2013.01)
(58) Field of Classification Search
CPC ............. H04W 4/029; H04W 88/085; H04W 52/0216; H04W 52/0254; H04W 64/00; H04W 76/27; H04W 64/006; H04W 4/02; H04W 24/08; H04W 88/08; H04W 92/20; H04L 5/0048; H04L 5/0051; H04L 5/0053; H04L 5/0098; G01S 5/0236; Y02D 30/70
See application file for complete search history.

(56) References Cited

U.S. PATENT DOCUMENTS

| 11,589,316 | B2 * | 2/2023 | Zhou ....................... H04L 5/001 |
| 12,047,899 | B2 * | 7/2024 | Khoryaev ............. H04L 5/0048 |
| 12,058,725 | B2 * | 8/2024 | Rico Alvarino ...... H04W 72/23 |
| 2013/0215811 | A1 * | 8/2013 | Takaoka ................ H04W 52/30 370/311 |

(Continued)

FOREIGN PATENT DOCUMENTS

| EP | 4271068 A1 * | 11/2023 | ............ H04W 64/00 |
| WO | 2020/045603 A1 | 3/2020 | |

(Continued)

OTHER PUBLICATIONS

Huawei: "Support RRC inactive mode for CU-DU", 3GPP Draft; R3-173133, vol. RAN WG3, Berlin, Germany; Aug. 21, 2017. (Year: 2017).*

(Continued)

*Primary Examiner* — Yuwen Pan
*Assistant Examiner* — Swati Jain

(57) ABSTRACT

A positioning configuration method in a wireless communication system and an electronic device are disclosed. The method performed by a first node includes: identifying that a user equipment (UE) enters into an inactive state, and transmitting, to a second node, a message including information associated with a reservation of a positioning related configuration, wherein the positioning related configuration is not released for the UE in the inactive state based on the message.

7 Claims, 19 Drawing Sheets

(56) References Cited

U.S. PATENT DOCUMENTS

| | | | | |
|---|---|---|---|---|
| 2016/0345210 | A1* | 11/2016 | Shan | H04W 8/04 |
| 2019/0037522 | A1* | 1/2019 | Tenny | H04W 64/00 |
| 2020/0178137 | A1* | 6/2020 | Hassan Hussein | H04W 36/32 |
| 2020/0229130 | A1* | 7/2020 | Keating | H04W 52/0229 |
| 2021/0185578 | A1* | 6/2021 | Zhuo | H04W 36/22 |
| 2021/0266764 | A1* | 8/2021 | Khanfouci | H04W 24/02 |
| 2021/0282062 | A1* | 9/2021 | Wang | H04L 41/0816 |
| 2021/0282072 | A1* | 9/2021 | Xin | H04W 28/16 |
| 2022/0116902 | A1* | 4/2022 | Liu | H04W 4/029 |
| 2023/0198708 | A1* | 6/2023 | Hong | H04L 5/0094 370/329 |
| 2023/0273287 | A1* | 8/2023 | Wigren | G01S 5/0294 342/451 |
| 2023/0379860 | A1* | 11/2023 | Rao | H04W 64/00 |

FOREIGN PATENT DOCUMENTS

| | | | | |
|---|---|---|---|---|
| WO | 2020/168573 | A1 | 8/2020 | |
| WO | WO-2020155949 | A1 * | 8/2020 | H04W 64/00 |

OTHER PUBLICATIONS

Huawei: "Open issues for RRC inactive support in CU-DU", 3GPP Draft; R3-173721, vol. RAN WG3, No. Prague, Czech; Oct. 9, 2017 (Year: 2017).*

Ericsson: "E1 support for RRC-inactive", 3GPP Draft; R3-182224, vol. RAN WG3, P. R. China; Apr. 15, 2018 (Year: 2018).*

Supplementary European Search Report dated Mar. 12, 2024, in connection with European Application No. 22796217.2, 10 pages.

Ericsson, "E1 support for RRC-inactive," R3-182224, 3GPP TSG-RAN WG3 #99bis, Sanya, P.R. China, Feb. 26-Mar. 2, 2018, 6 pages.

Huawei, "Support RRC inactive mode for CU-DU," R3-173133, 3GPP TSG-RAN WG3 meeting #97, Berlin, Germany, Aug. 21-25, 2017, 2 pages.

Huawei, "Open issues for RRC inactive support in CU-DU," R3-173721, 3GPP TSG RAN WG3 meeting #97bis, Prague, Czech Republic, Aug. 9-13, 2017, 4 pages.

International Search Report dated Aug. 1, 2022 in connection with International Patent Application No. PCT/KR2022/006196, 3 pages.

Written Opinion of the International Searching Authority dated Aug. 1, 2022 in connection with International Patent Application No. PCT/KR2022/006196, 5 pages.

Office Action dated Oct. 29, 2025, in connection with Korean Application No. 10-2023-7025162, 11 pages.

* cited by examiner

POSITIONING CONFIGURATION METHOD AND ELECTRONIC DEVICE

CROSS-REFERENCE TO RELATED APPLICATIONS

This application is based on and claims priority under 35 U.S.C. § 119(a) of a Chinese patent application number 202110482534.2, filed on Apr. 30, 2021, in the China National Intellectual Property Administration, a Chinese patent application number 202110534367.1, filed on May 17, 2021 and a Chinese patent application number 202111591924.X, filed on Dec. 23, 2021, in the China National Intellectual Property Administration the disclosures of which are incorporated by reference herein in their entirety.

BACKGROUND

1. Field

The disclosure relates to the technical field of wireless communication, and more specifically, to a positioning configuration method and electronic device.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Aspects and advantages of the disclosed embodiments will be set forth in part in the following description, or may be learned from the description, or may be learned by the practice of the embodiments.

The disclosure provides a positioning configuration method and device.

To achieve the above purpose, the disclosure adopts the following technical solutions.

According to an aspect of the embodiments of the present disclosure, a method performed by a first node in a wireless communication system is provided. The method includes: identifying that a user equipment (UE) enters into an inactive state, and transmitting, to a second node, a message including information associated with a reservation of a positioning related configuration, wherein the positioning related configuration is not released for the UE in the inactive state based on the message.

According to another aspect of the embodiments of the present disclosure, a first node in a wireless communication system is provided. The first node includes a memory and a processor coupled with the memory. The processor is configured to identify that a user equipment (UE) enters into an inactive state, and transmit, to a second node, a message including information associated with a reservation of a positioning related configuration, wherein the positioning related configuration is not released for the UE in the inactive state based on the message.

According to another aspect of the embodiments of the present disclosure, a method performed by a second node in a wireless communication system is provided. The method includes: receiving, from a first node, a message based on a user equipment (UE) entering into an inactive state, wherein the message includes information associated with a reservation of a positioning related configuration, and determining not to release the positioning related configuration for the UE in the inactive state based on the message.

According to another aspect of the embodiments of the present disclosure, a first node in a wireless communication system is provided. The first node includes a memory and a processor coupled with the memory. The processor is configured to receive, from a first node, a message based on a user equipment (UE) entering into an inactive state, wherein the message includes information associated with a reservation of a positioning related configuration. The processor is further configured to determine not to release the positioning related configuration for the UE in the inactive state based on the message.

According to another aspect of the embodiments of the present disclosure, a method performed by a user equipment (UE) in a wireless communication system is provided. The method includes: entering an inactive state, receiving, from a first node, a message including information associated with a reservation of a positioning related configuration, and performing a positioning measurement in the inactive state based on the positioning related configuration which is not released based on the message.

According to another aspect of the embodiments of the present disclosure, a user equipment (UE) in a wireless communication system is provided. The UE includes a memory and a processor coupled with the memory. The processor is configured to: enter an inactive state, receive, from a first node, a message including information associated with a reservation of a positioning related configuration, and perform a positioning measurement in the inactive state based on the positioning related configuration which is not released based on the message.

According to another aspect of the embodiments of the present disclosure, a positioning configuration method in a wireless communication system is provided. The method includes: receiving, by a second node, first information related to positioning of a user equipment (UE) under a first node from the first node; and transmitting, by the second node, second information related to positioning of the UE under the second node to a third node according to the first information; or, deciding, by the second node, whether to release configuration related to positioning of the UE under the second node according to the first information; or, deciding, by the second node, to activate positioning measurement of the UE according to the first information.

According to an exemplary embodiment, the third node is determined based on the first information.

According to an exemplary embodiment, the method further includes: transmitting, by the second node, third information related to positioning of the UE under the second node to a node for location management and/or the UE directly or via the first node according to the first information.

According to an exemplary embodiment, the first information includes at least one of the followings:
(1) relevant information for indicating a node for location management;
(2) relevant information for indicating a transaction or measurement ID of a positioning procedure;
(3) information related to configuration of positioning signal of the UE;
(4) relevant information for requested positioning signal transmission characteristics;
(5) relevant information for positioning activation;
(6) relevant information for positioning measurement request;
(7) information for indicating not to release positioning-related configuration information;
(8) information for indicating release of positioning-related configuration; or
(9) information on scheduled time for activating positioning measurement.

According to an exemplary embodiment, the third information is configured based on the relevant information for indicating the node for location management and/or the information for indicating the transaction or measurement ID of the positioning procedure and/or the information related to configuration of positioning signal of the UE in the first information, and/or is configured according to the relevant information for requested positioning signal transmission characteristics in the first information; and/or the third information includes configuration of a positioning signal of the UE under the second node and/or relevant information indicating whether the configuration of the positioning signal is changed.

According to an exemplary embodiment, based on information of a node or cell, where a positioning reference point is located, included in the first information, the third node is determined as the node, or a node where the cell is located.

According to an exemplary embodiment, the second information includes at least one of the following information:
(1) relevant information for indicating a node for location management;
(2) relevant information for indicating a transaction or measurement ID of a positioning procedure;
(3) relevant information for positioning measurement request;
(4) relevant information for positioning activation; or
(5) third information related to positioning of the UE under the second node.

According to an exemplary embodiment, the receiving, by the second node, first information related to positioning of the UE under the first node from the first node includes at least one of the followings:

(1) receiving, by a base station, the first information from the node for location management;
(2) receiving, by a base station, the first information from the UE;
(3) receiving, by a second base station, the first information from a first base station;
(4) receiving, by a distributed unit (DU) of a base station, the first information from a centralized unit (CU) of the base station;
(5) receiving, by a base station, the first information from a core network node; or
(6) receiving, by a core network, the first information from a base station.

According to an exemplary embodiment, the second node receives the first information from the first node through a message related to retrieve UE context or a message related to handover, or the second node receives the first information from the UE through a radio resource control (RRC) related message.

According to an exemplary embodiment, the method further includes at least one of the following situations in which:
(1) the second node transmits third information to the node for location management through a relevant message for path switch of next generation (NG) application protocol (NGAP), or a relevant message for transmission a first non-access stratum (NAS) message of the UE, or a relevant message for transmitting uplink non-UE-associated NR positioning protocol A (NRPPa) transport;
(2) the second node receives information on positioning activation request from the node for location management through a relevant message for path switch of NG application protocol (NGAP) or a relevant message for release of connection;
(3) the second node transmits a third information to the node for location management via the first node through an Xn message; or
(4) the second node receives the information on positioning activation request transmitted from the node for location management via the first node through the Xn message.

According to another aspect of the embodiments of the present disclosure, a positioning configuration method in a wireless communication system is provided. The system includes: based on first information related to positioning of a user equipment (UE) under a first node received by a second node from the first node, receiving, by a third node, second information related to positioning of the UE under the second node from the second node.

According to an exemplary embodiment, the first information includes at least one of the followings:
(1) relevant information for indicating a node for location management;
(2) relevant information for indicating a transaction or measurement ID of a positioning procedure;
(3) information related to configuration of positioning signal of the UE;
(4) relevant information for requested positioning signal transmission characteristics;
(5) relevant information for positioning activation; or
(6) relevant information for positioning measurement request.

According to an exemplary embodiment, the third node receives the second information from the second node according to information of a node or cell, where a positioning reference point is located, which is indicated by the relevant information for positioning measurement request in the first information.

According to an exemplary embodiment, the second information includes at least one of the following information:
(1) relevant information for indicating a node for location management;
(2) relevant information for indicating a transaction or measurement ID of a positioning procedure;
(3) relevant information for positioning measurement request;
(4) relevant information for positioning activation; or
(5) third information related to positioning of the UE under the second node.

According to another aspect of the embodiments of the present disclosure, a positioning configuration method in a wireless communication system is provided. The method includes: transmitting, by a first node, first information related to positioning of a UE under the first node to a second node, wherein the first information is used for the second node to transmit second information related to positioning of the UE under the second node to a third node.

According to another aspect of the embodiments of the present disclosure, a positioning configuration method in a wireless communication system is provided. The method includes: generating, by a node for location management, information on candidate positioning reference point; and transmitting, by the node for location management, the information on candidate positioning reference point to a first node.

According to an exemplary embodiment, the information on the candidate positioning reference point includes at least one of the following information:
(1) relevant information indicating a positioning scope; or
(2) relevant information indicating a positioning reference point corresponding to the positioning scope.

According to an exemplary embodiment, the information on the candidate positioning reference point or the relevant information of positioning reference point in the information on the candidate positioning reference point includes at least one of the following information:
(1) relevant information indicating a base station where the candidate positioning reference point or the positioning reference point is located;
(2) relevant information indicating the candidate positioning reference point or the positioning reference point under the base station; or
(3) information indicating positioning assistance on the candidate positioning reference point or the positioning reference point.

According to an exemplary embodiment, the method further includes transmitting, by the node for location management, information on positioning activation time to the first node.

According to another aspect of the embodiments of the present disclosure, a positioning configuration method in a wireless communication system is provided. The method includes:
(1) receiving, by a first node, information on candidate positioning reference point from a node for location management;
(2) based on the information on candidate positioning reference point, determining, by the first node, a positioning reference point; or (3) transmitting a message for requesting positioning-related information to a node where the positioning reference point is located.

According to an exemplary embodiment, the message for requesting positioning-related information includes at least one of the following information:
(1) information on positioning reference point;
(2) information on indication of assistance information request;
(3) ID information of positioning measurement;
(4) information related to configuration of positioning signal; or
(5) information related to reporting mode for positioning measurement.

According to another aspect of the embodiments of the present disclosure, an electronic device including a processor and a memory is provided, wherein the memory stores a program; the processor executes the program to implement any one of the foregoing methods.

The above and other features, aspects and advantages of various embodiments of the present disclosure will be better understood with reference to the following description and appended claims. The accompanying drawings, which form a part of this disclosure, illustrate example embodiments of the present disclosure and, together with the description, serve to explain related principles. The details of one or more implementations of the subject matter of the present disclosure are set forth in the accompanying drawings and the description below. Other potential features, aspects, and advantages of the subject matter of the present disclosure will also be apparent from the description, drawings, and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The present disclosure will be more easily understood from the following detailed description with the aid of the accompanying drawings, in which.

In the various figures, the same or similar reference numbers and symbols indicate the same or similar elements.

DETAILED DESCRIPTION

FIGS. 1 to 15 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

Figure 1:
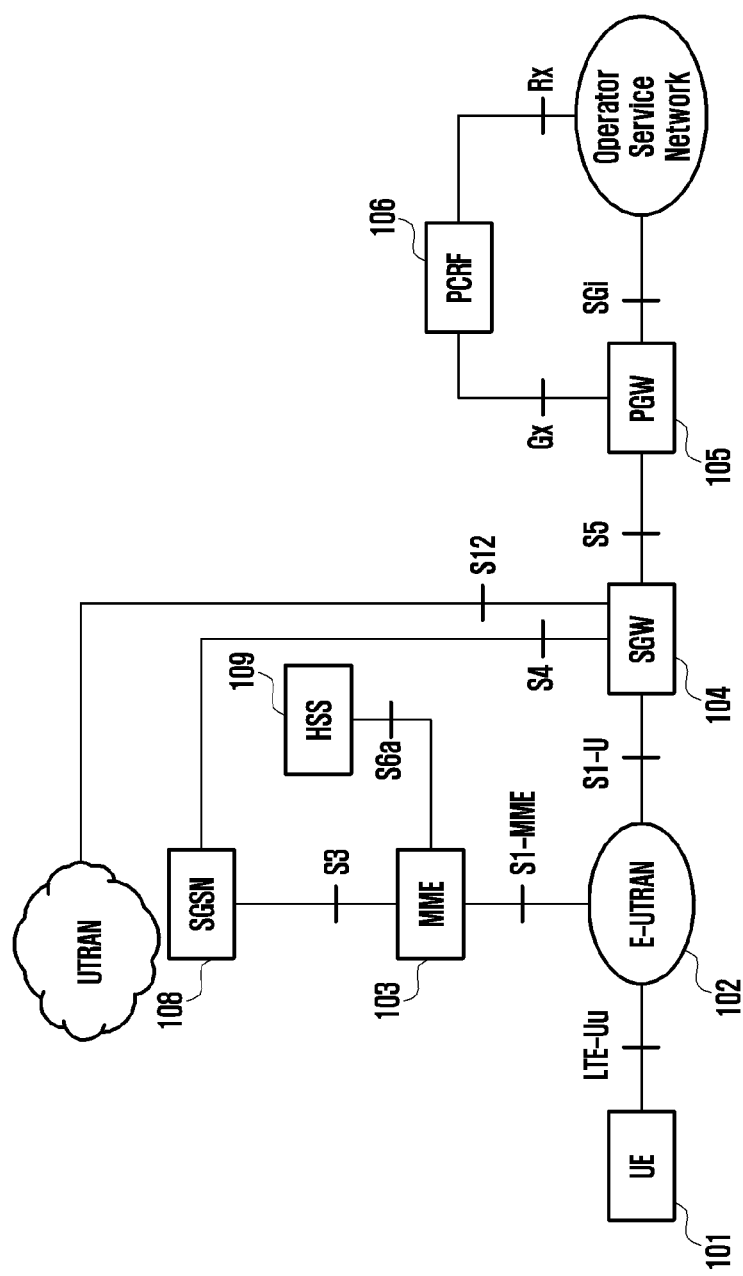
FIG. 1 illustrates an exemplary system architecture of system architecture evolution (SAE)

FIG. 1 illustrates an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
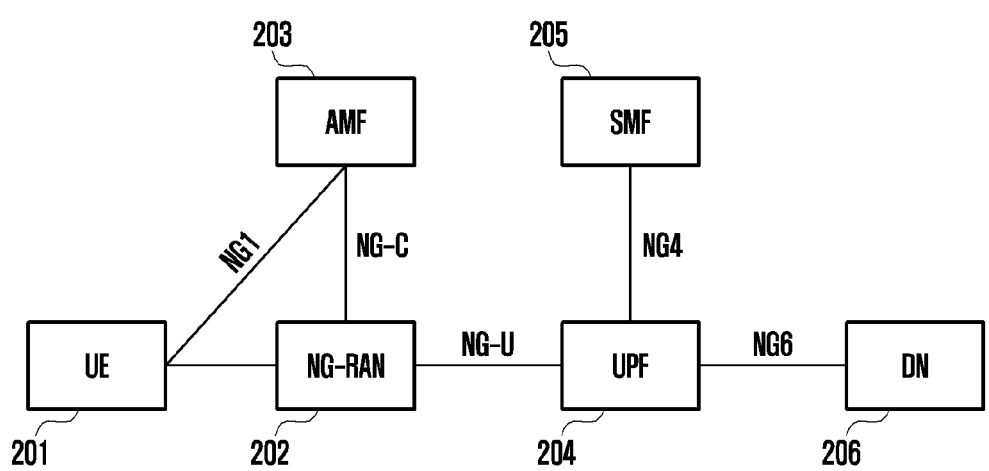
FIG. 2 illustrates an exemplary system architecture according to various embodiments of the present disclosure.

FIG. 2 illustrates an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

With the development of wireless technology, in the 5G architecture, the functional modules originally located in the same base station are separated. Among them, some functional modules are getting closer and closer to users, while other modules are pooled and virtualized for centralized deployment. That is to say, the base station can be divided into two parts, one of which is the central unit (CU), and the other of which is the distributed unit (DU). DU is closer to users, while CU is far away from antennas, which can support multi-antenna connection and improve network performance. One CU can connect to multiple DUS, and the functions on the CU can be virtualized. The CU and the DU are connected through F1 interface, which is also called a fronthaul interface or a fronthaul connection. The functions of radio resource control (RRC) and packet data convergence protocol (PDCP) are implemented in the CU, and the functions of radio link control (RLC), media access control (MAC) and the physical layer are implemented in the DU.

With the development of mobile communication and the diversification of services, user positioning has gradually become one of the applications of great importance in the communication network, and the requirements for the delay and accuracy of positioning are getting higher and higher. In many positioning applications, precise positioning is usually achieved by the combination of various technologies, including: 1) the solution based on global navigation satellite system (GNSS); 2) wireless technology (such as LTE network, Wi-Fi network, terrestrial beacon system, etc.); 3) the inertial measurement unit (IMU) or the sensor (for example, tracking user's location based on accelerometer, gyroscope, magnetometer, or vertical positioning by an atmospheric pressure sensor). These technologies are expected to play an important role in achieving precise user positioning in the future.

New wireless technologies used in NG-RAN, such as rich frequency band resources, multi-antenna technology with larger bandwidth and large-scale antenna array, and flexible deployment methods, such as the use of non-terrestrial wireless access network, all provide more freedom and dimensions for enhancing positioning capability, and can realize more precise user positioning.

Exemplary embodiments of the present disclosure are further described below with reference to the accompanying drawings.

The text and drawings are provided as examples only to help understand the present disclosure. They should not be construed as limiting the scope of the present disclosure in any way. Although some embodiments and examples have been provided, based on the disclosure herein, it is obvious to those skilled in the art that changes can be made to the illustrated embodiments and examples without departing from the scope of this disclosure.

According to the positioning configuration method provided by the disclosure, the interruption time of positioning measurement can be reduced during UE mobility, and the positioning procedure can be completed more quickly; at the same time, the positioning configuration method can also enable the nodes selected for positioning to obtain positioning-related configuration information in advance, thus avoiding repeated transmission of the configuration information, reducing the positioning delay and the signaling exchange between the nodes, and helping to apply positioning results to other functions more quickly, while reducing power consumption of network devices, thereby increasing operator benefits.

According to the difference of entities that finally evaluates and calculates the location of the UE, the positioning can be divided into UE-based positioning and location management function entity (LMF)-based positioning, and the next generation radio access network (NG-RAN) can participate in assisting the above two positioning methods.

Figure 3:
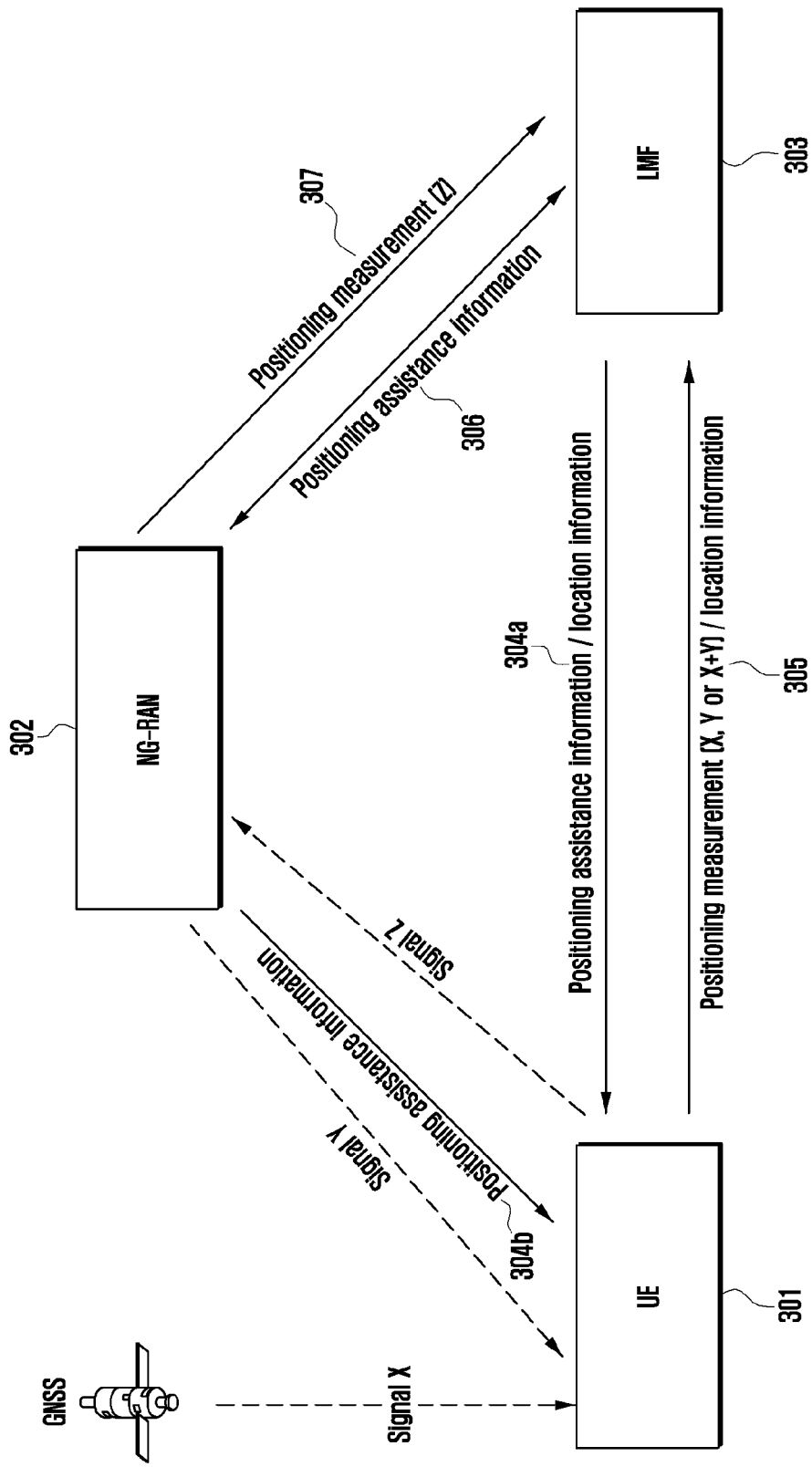
FIG. 3 illustrates the positioning architecture and flow diagram in the 5G network.

FIG. 3 illustrates the positioning architecture and flow diagram in the 5G network. As shown in FIG. 3, user equipment (UE) 301 is a terminal device for receiving data. The NG-RAN 302 is a wireless access network, which can be a terrestrial access network and/or a non-terrestrial wireless access network, such as a network providing coverage by satellites, unmanned aerial vehicles and the like. The location management function entity (LMF) 303 is responsible for managing the overall resource coordination and scheduling required to position the UE location.

UE-based positioning means that the UE calculates location information of the UE itself according to positioning assistance information and signal measurement result. The location assistance information can be 304a transmitted to UE by LMF, or 304b transmitted to UE by NG-RAN according to the instruction of LMF. The signal measurement result may be a measurement result obtained by the UE through the received GNSS signal X and/or NG-RAN signal Y. After calculating the location information, the UE may report 305 the location information to the LMF.

LMF-based positioning means that LMF calculates location information of the UE according to positioning assistance information and signal measurement result. Wherein, the positioning assistance information can be 306 transmitted by the NG-RAN to the LMF. The signal measurement result can be 307 the measurement result obtained by NG-RAN through receiving signal Z, and the measurement result can be transmitted to LMF; and the signal measurement result can also be 305 a measurement result obtained by the UE according to the GNSS signal X and/or NG-RAN signal Y, and the measurement result is sent back to LMF. After LMF obtains or calculates the location information of the UE, the UE can transmit out the location information according to the request of the client. For example, the client can be a UE or a core network node.

Figure 4A:
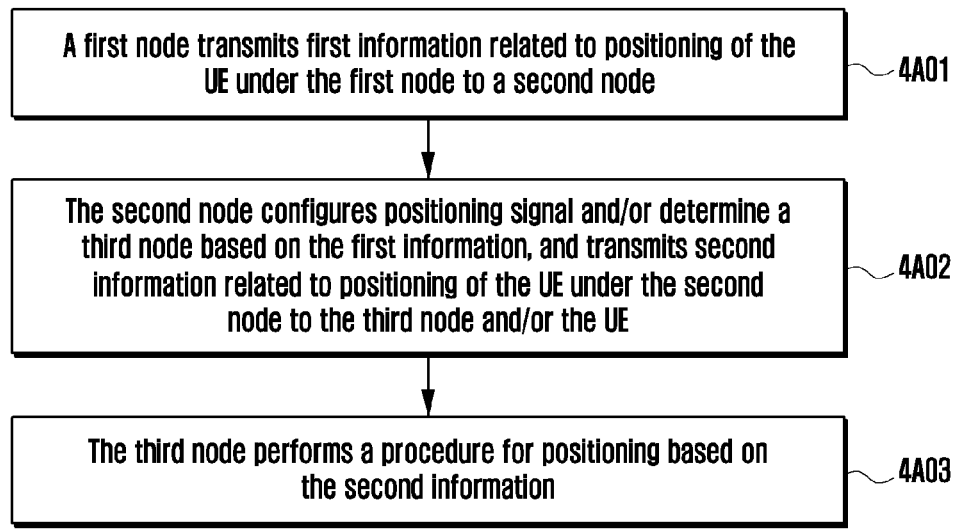
FIG. 4A illustrates a flowchart of a positioning configuration method according to an embodiment of the present disclosure.

One of the positioning configuration methods of the present disclosure is shown in FIG. 4A. A detailed description of steps irrelevant to the present disclosure is omitted here. The method includes the following steps.

Step 4A01, a first node transmits, to a second node, first information related to the UE under the first node. The first node may be, for example, a UE, a base station, a CU, a CU-CP (control plane) or a core network node, or the first node may be a node for location management (such as LMF), which may be implemented on the UE, the base station and/or the core network node, for example. The second node may be, for example, a base station, a CU or a UE. There may be situations where the first message may be transmitted by the first base station to the second base station, that is, transmitted by the source base station to the target base station in the handover procedure, or the first message may be transmitted by the last serving base station transmitted to the new serving base station in the procedure of retrieve UE context, or the first message may be transmitted by the UE to the base station, and so on.

According to exemplary embodiments, the first information may be at least one of the following information:
Relevant information for indicating a node for location management, such as information for indicating an LMF. The node for location management refers to a node for managing UE positioning, and the information for indicating the node for location management may be information indicating an identification of the node, such as LMF Routing ID;
Relevant information for indicating a transaction or measurement ID of a positioning procedure, which is used to indicate a unique positioning procedure on different nodes or interfaces, and may include at least one of an NRPPa Transaction ID and an LMF measurement ID;
Information on the configuration of the UE positioning signal, which refers to the resource configuration of the positioning signal. The resource configuration of the positioning signal can be the configuration of the uplink or downlink positioning signal, such as SRS configuration and/or time information related to SRS configuration, or
Relevant information for the requested positioning signal transmission characteristics, which can be the requested positioning signal transmission characteristics or the requested signal transmission characteristics. However, the relevant information for the requested positioning signal transmission characteristics of the present disclosure is not limited thereto, and may be, for example, a positioning signal, a positioning reference signal or other positioning-related signals.

According to exemplary embodiments, the requested signal transmission characteristics may be generated by the first node itself, or may be received from other nodes such as nodes having the location management function (LMF) or other base stations. The requested signal transmission characteristics are used to indicate that the node serving of the UE to allocate the positioning signal, and the serving node of the positioning UE can decide the signal configuration such as physical resource allocation and/or transmission period of the signal and/or channel according to the transmission characteristics, and the positioning signal and/or channel can be other signals and/or channels such as SRS (uplink sounding reference signal) and/or DMRS, etc.
Relevant information for positioning activation, which may include a type of positioning signal and transmission time information of the positioning signal; and
Relevant information for positioning measurement request, which can indicate how to receive and measure positioning signals and how to report measurement results by the nodes selected for positioning. The information may include information for indicating a positioning reference point, which refers to a reference point selected for positioning and may be, for example, a transmission point (TP) or a transmission and reception point (TRP). The information may be, for example, a TRP measurement request list, a report configuration and/or a number of TRP measurements, wherein the TRP measurement request list includes information related to the node where the TRP is located, such as relevant information for identifying the node.

Although specific examples of the relevant information for indicating a node for location management, the information for indicating the transaction or measurement ID of the positioning procedure, the information on configuration of UE positioning signal, the relevant information for requested positioning signal transmission characteristics, relevant information for positioning activation, and/or relevant information for positioning measurement request have been described above, the present disclosure is not limited thereto. For example, the relevant information for the requested signal transmission characteristics may be for all signals and/or channels for positioning, and may also be resource configuration requirements for the requested signal and/or channel transmission, etc.

Step 4A02: the second node transmits the second information related to the UE under the second node to the third node and/or the UE according to the received first information. According to exemplary embodiments, the second node may determine the third node and/or configure the positioning signal according to the first information.

For example, that second node may perform at least one of the follows:
(1) Configuring the positioning signal of the UE under the second node, according to the information related to the configuration of the positioning signal of the UE included in the first information (this information can be information related to the configuration of the positioning signal of the UE under the first node);
(2) Configuring the positioning signal of the UE under the second node according to the information related to the positioning signal configuration of the UE under the first node retrieved (e.g., inquired) according to the relevant information for indicating the node for location management and/or the information for indicating the transaction or measurement ID of the positioning procedure included in the first information;
(3) Configuring the positioning signal of the UE under the second node according to the information related to the requested positioning signal transmission characteristics included in the first information;
(4) Obtaining the information of the node where the TRP selected for positioning measurement is located, according to the relevant information for positioning measurement request included in the first information, determining a third node, and transmitting the second information to the third node; and
(5) Determining the third node according to the relevant information for indicating a node for location management included in the first information, and transmitting the second information to the third node and/or the UE.

According to an exemplary embodiment, the second information is information related to the positioning of the UE under the second node, and may include at least one of the following:

Relevant information for indicating a node for location management, which is the same as described in step 4A01;

Information on for indicating the transaction or measurement ID of the positioning procedure, which is the same as described in step 4A01;

Relevant information for positioning measurement request, indicating how to receive and measure positioning signals and how to report measurement results by the nodes selected for positioning, wherein this information may include a TRP measurement request list, a report configuration and/or a number of TRP measurements;

Relevant information for positioning activation, which may include a type of positioning signal and transmission time information of the positioning signal;

Configuration of positioning signal of UE under second node, indicating information such as the time-frequency resource position for transmission of the positioning signal of the UE under the second node; or Relevant information indicating whether the configuration of the positioning signal is changed, indicating whether the time-frequency resource position for transmission of the positioning signal of the UE under the second node is the same as the time-frequency resource position for transmission of the positioning signal of the UE under the first node.

Step 4A03: the third node performs the procedure for positioning according to the received second information. The procedure may be, for example, a positioning configuration procedure, a positioning activation procedure and/or a positioning measurement request procedure.

In this way, the positioning configuration method at least achieves the following beneficial effects: after the UE is handed over or reselected to a new cell or node, the new serving node or cell can configure the positioning signal for the UE more quickly, and the nodes selected for positioning and the UE can also obtain new positioning configuration more quickly, which not only reduces the signaling exchange with the core network nodes, but also reduces the time of positioning interruption and delay of positioning, and obtains positioning results more quickly, so as to better support the requirements of various commercial use cases and industrial Internet use cases.

So far, the description of a positioning configuration method of the present disclosure has been made. By this method, the UE can complete the positioning procedure more quickly in the handover or reselection procedure, reducing the delay of positioning and signaling exchange between nodes, helps to apply the positioning results to other functions more quickly, and also reduces the power consumption of network equipment as well, thereby increasing the operator's income.

Figure 4B:
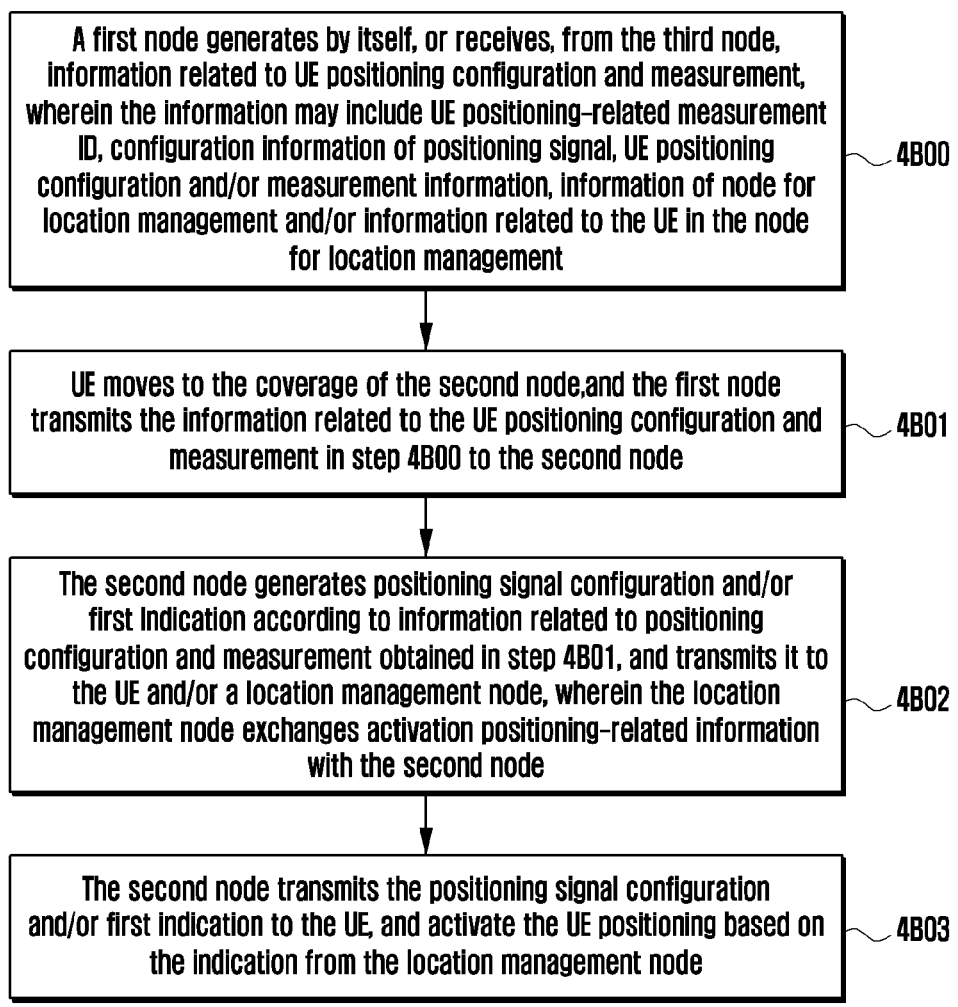
FIG. 4B illustrates a flowchart of a positioning configuration method according to an embodiment of the present disclosure.

A positioning configuration method of the present disclosure is shown in FIG. 4B. A detailed description of steps irrelevant to the present disclosure is omitted here. The method includes the following steps.

In one example of Step 4B00, the first node generates, or receives, from the third node, information related to the positioning of the UE when serving by the first node (for example, information related to positioning configuration and measurement). The first node may be a UE, a base station, a CU, a CU-CP (control plane) or a core network node, or may be a node supporting a location management function, which may be implemented on the UE, the base station and/or the core network node. The third node may be a base station, an LMF or a UE.

According to exemplary embodiments, the information may be at least one of the following information:

Information for indicating a node for location management function, which is used to indicate a node having the location management function for managing the UE positioning, such as an LMF Routing ID;

Relevant information for indicating a transaction or measurement ID of a positioning procedure, which is used to indicate the unique positioning procedure on different nodes or interfaces, wherein the ID information may include at least one of an NRPPa transaction ID and an LMF measurement ID;

Information related to configuration of UE positioning signal, which can indicate the configuration of the uplink positioning signal, such as SRS configuration and/or time information related to SRS configuration, etc.

Requested signal transmission characteristics, which may be generated by the first node itself, or received from other nodes, such as the node having the location management function (LMF) or other base stations. The requested signal transmission characteristics are used to indicate that the serving node of the UE to allocate the positioning signal, and the node serving the positioning UE can decide the signal configuration such as physical resource allocation and/or transmission period of the signal and/or channel according to the transmission characteristics, and the positioning signal and/or channel can be other signals and/or channels such as uplink sounding reference signal (SRS) and/or DMRS.

Information for positioning activation, which includes a type of positioning signal and transmission time information of the positioning signal; or Information for positioning measurement request, indicating how to receive and measure positioning signals and how to report measurement results by the nodes selected for positioning, wherein this information may include a TRP measurement request list, a report configuration and/or a number of TRP measurements.

Although specific examples of measurement ID related to UE positioning, configuration information of positioning signals, requested signal transmission characteristics, information for positioning activation, and/or information for positioning measurement request have been described above, the present disclosure is not limited thereto. For example, the requested signal transmission characteristics may be for all signals and/or channels for positioning, and may also be resource configuration requirements for the requested signal and/or channel transmission, etc.

In one example of Step 4B01, when the UE moves to the coverage of the second node, the first node transmits information related to positioning to the second node, which may include information for indicating a node for location management, ID information related to UE positioning, configuration information related to UE positioning signal, requested signal transmission characteristics, information for positioning activation and/or information for positioning measurement request. The second node may be a base station or a DU. That is, it is possible that the UE transmits the information related to positioning to the base station; or the first base station transmits information related to positioning to the second base station; or the CU transmits information to DU; or the core network node transmits information related to positioning to the base station.

In one example of Step 4B02, the second node configures the positioning signal after the UE moves under the second node, considering the received information related to positioning. According to the received information, there are two processing situations for the second node:

In one example of Situation 1, if the information includes the measurement ID related to UE positioning and/or the configuration information related to the UE positioning signal, the second node checks whether the second node has a measurement ID of the ongoing positioning measurement that matches the measurement ID in the received positioning measurement information, e.g., LMF measurement ID is the same. If the measurement ID is the same, it means that the second node is one of the nodes selected for positioning the UE. Instead of or in addition to measurement ID being the same, the second node can also check whether the corresponding cell information and/or SRS configuration in the measurement are consistent with that in the positioning measurement related information received in step 4B01, and further confirm whether the second node is one of the nodes selected for the UE positioning. If the second node is one of the nodes selected for positioning the UE and/or the cell where TRP involved in positioning is located is a target cell for the UE handover, it means that the second node already has the positioning configuration information of the UE and is connected with the location management function node that manages the positioning of the UE. If the second node supports the current positioning signal configuration of the UE, that is, the second node can allocate the same positioning signal resources to the UE, the second node indicates to the location management function node, the first node and/or the UE that the positioning signal configuration of the UE is unchanged, and the second node can also indicate to the location management function node that the UE has moved to the second node and allocated positioning signals for the UE by itself, and the positioning signals remain unchanged. In this way, even if the UE moves to a new node, the positioning signal configuration of the UE can remain unchanged, and the location management function node can reselect the nodes selected for the positioning measurement for the UE according to the information provided by the second node. The procedure avoids the interruption of positioning and reduces the positioning delay problem during mobility.

In one example of Situation 2, if the information includes the requested signal transmission characteristics, and/or the location management node information, and/or information related to the UE in the location management node, or there is no matching ongoing positioning measurement in the second node, the second node can consider the requested signal transmission characteristics, configure a new positioning signal of the UE under the second node, and transmit the new positioning signal to the UE and/or the location management function node. The second node can exchange the updated positioning signal configuration and/or information related to activating the positioning procedure with the location management function node according to the location management function node information and/or UE information in the location management function node. The exchanged information can be exchanged through a path switch procedure or a non-UE-associated NR positioning protocol A (NRPPa) transport procedure when the UE context has not been fully established on the second node, so that the time of positioning interruption and the delay of positioning can be reduced.

In one example of Step 4B03, the second node transmits a positioning activation to the UE.

After UE positioning is activated, if the positioning signal configuration is changed, other nodes selected for positioning UE need to obtain updated positioning measurement information, which can be directly transmitted by the second node to other nodes or transmitted by the location management function node to other nodes which can be base stations.

If the second node directly transmits updated positioning measurement information to other nodes, the second node obtains the information of other nodes through the information in positioning measurement request, and transmits the information in positioning activation and/or the information in positioning measurement request received in step 4B02 to other nodes.

If the location management node transmits the updated positioning measurement information to other nodes, the location management node transmits the positioning signal configuration information received in step 4B02 to other nodes that need to participate in positioning measurement, wherein other nodes can be base stations, and other nodes receive and measure the positioning reference signals of the UE on the corresponding time-frequency resources according to the signal configuration information, and then response the measurement results to the location management function node, and the location management function node calculates and obtains the location of the UE according to all the received positioning measurement results.

In this way, after handover or reselection to a new cell or node, the UE can obtain the positioning signal configuration more quickly, and the network can obtain the location information of the UE more quickly. At the same time, it also saves the signaling exchange between nodes and reduces the positioning latency.

So far, the description of a positioning configuration method of the present disclosure has been made. By this method, the UE can complete the positioning procedure more quickly in the handover or reselection procedure, which reduces the delay of positioning and signaling exchange between nodes, helps to apply the positioning results to other functions more quickly, and also reduces the power consumption of network equipment as well, thereby increasing the operator's income.

Figure 4C:
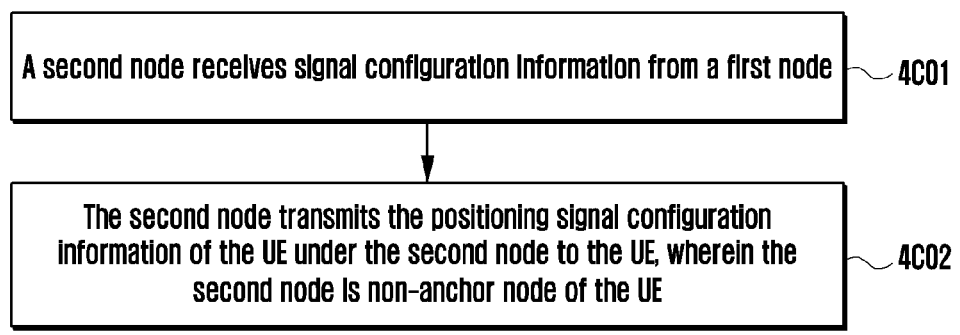
FIG. 4C illustrates a flowchart of a positioning configuration method according to an embodiment of the present disclosure.

A positioning configuration method of the present disclosure is shown in FIG. 4C. Detailed descriptions of steps unrelated to the present disclosure are omitted here. The method includes steps:

In one example of Step 4C01, the second node receives signal configuration information from the first node, wherein the second node may be a base station, and the first node may be a base station or an LMF. For example, the signal configuration information may be information related to the UE positioning configuration, but is not limited thereto, and may also be other configuration information (e.g., the configuration of the SRB4, which is used to transmit messages in the INACTIVE state). The information related to the UE positioning configuration may be the requested positioning signal (e.g., SRS) transmission characteristics and/or transmission characteristics of the positioning signal currently configured for the UE (e.g., the transmission period of the positioning signal, the spatial relation of the positioning signal, etc.). It is understood that the above is merely an example, and the information related to the UE positioning configuration is not limited thereto. According to an embodiment, the second node is the current serving node for the UE, which can be considered as a non-anchor node of the UE, and the first node is the node where the UE context is located, which can be considered as an anchor node of the UE. The information related to the UE positioning configuration may be included in the retrieve UE context response message, or in the retrieve UE context failure message, or in the positioning information request message, or in other XnAP messages. It should be understood that the above embodiments are merely examples, and the first node, the second node and the message including the information related to the UE positioning configuration are not limited thereto.

When the second node receives the information related to the UE positioning configuration from the first node, the second node may use the information related to the UE positioning configuration when configuring the positioning signal transmission for the UE.

In one example of Step 4C02, the second node transmits the positioning signal configuration information of the UE under the second node to the UE. According to an embodiment, the second node transmits the positioning signal configuration information to the UE through an RRC release message assembled by the first node and including the positioning signal configuration information of the UE under the second node. For example, the second node transmits the positioning signal configuration information of the UE under the second node to the first node, and the first node includes the positioning signal configuration information in the RRC release message and transmits a container including the RRC release message to the second node, and the second node transparently transmits the RRC release message in the container to the UE. In this case, the second node may directly forward the RRC release message in the container to the UE without reading the RRC release message.

According to an embodiment, the positioning signal configuration information may be included in an XnAP message to be transmitted from the second node to the first node, and the XnAP message may be, for example, a positioning information response message. It should be understood that the above embodiments are merely examples, and the first node, the second node and the message including the information related to the UE positioning configuration are not limited thereto.

According to an embodiment, the first node receives the positioning signal configuration information from the second node. In the case where the first node transmits an RRC release message to the UE, the positioning signal configuration information may be included in the RRC release message, wherein the positioning signal configuration information may be the transmission configuration of the positioning signal by the UE under the second node.

The first node may transmit a message including an RRC container to the second node, and the RRC container includes the RRC release message. According to an embodiment, the message including the RRC container may be a retrieve UE context failure message, a retrieve UE context response message, or a UE context release message. It should be understood that the above embodiments are merely examples, and the messages including the RRC container are not limited thereto.

The second node may receive the message including the RRC container from the first node, and the second node transparently transmits the RRC release message in the RRC container to the UE. The UE receives the RRC release message, and transmits an uplink positioning signal for positioning according to the positioning signal configuration of the UE under the second node included in the RRC release message. In this way, when the UE moves to a new base station, even if anchor node of the UE remains unchanged and the UE state remains unchanged, the configuration information of the UE under the new base station can be obtained, thereby realizing uplink positioning of the UE in the RRC_INACTIVE state.

So far, the description of a positioning configuration method of the present disclosure is made. With this method, the method can support configuring the signal for the UE in a case that the anchor node of the UE remains unchanged and the state remains unchanged, that is, the configuration information of the positioning signal of the non-anchor node is transmitted to the UE, which can complete the positioning procedure more quickly, reduce the delay of positioning and the signaling exchange between nodes, help to apply the positioning results to other functions more quickly, and also reduce the power consumption of network equipment, thereby increasing the operator's income.

Figure 5:
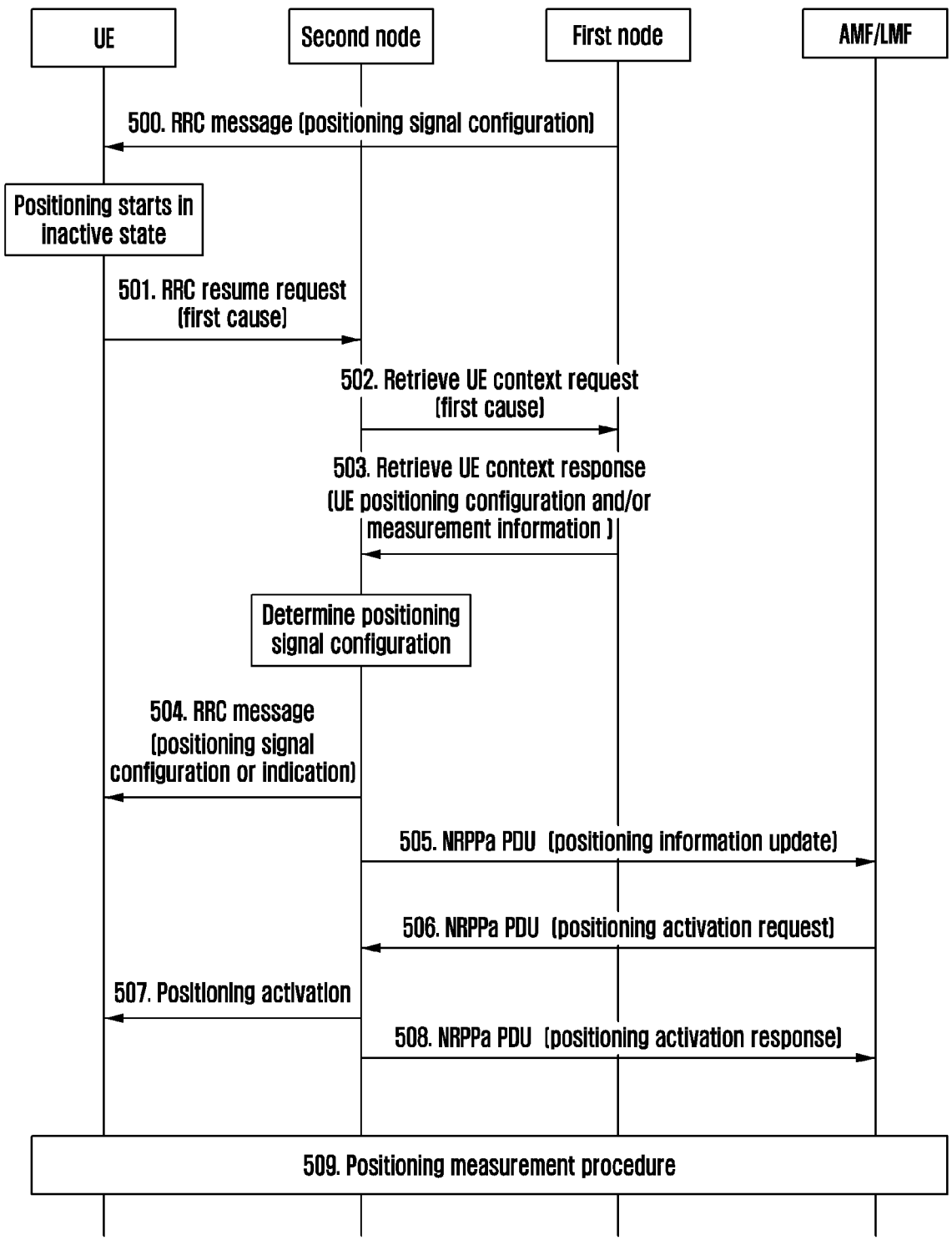
FIG. 5 illustrates a diagram of an Embodiment 1 of a positioning configuration method according to an embodiment of the present disclosure.

Embodiment 1 of a positioning configuration method of the present disclosure is shown in FIG. 5. A detailed description of steps irrelevant to the present disclosure is omitted here. The method includes the following steps.

In one example of Step 500, the first node transmits an RRC message to the UE, and the first node may be a base station serving the UE, a CU or a CU-CP. The RRC message includes positioning signal configuration information, which can be a positioning signal configuration for idle or inactive state.

The UE enters the inactive state and starts positioning in the inactive state.

In one example of Step 501, when the UE moves to the second node which may be a base station, the UE transmits an RRC resume request message to the second node, wherein the RRC resume request message may include a first cause, and the first cause is used to indicate to the second node that the purpose of connection resume initiated by the UE is to support the positioning function in the inactive state. The RRC resume request message may also include information of the last serving node for the UE and an ID of the UE.

In one example of Step 502, the second node transmits a retrieve UE context request message to the first node, which may include the first cause, the UE ID and/or ID information of the last serving node.

In one example of Step 503, the first node receives the information, the first node knows that the UE needs to be positioned in the inactive state, according to the first cause and the UE ID, and the first node transmits a retrieve UE context response message to the second node, which may include at least one of the following information:

Positioning-related measurement ID, which is used to indicate a positioning measurement at a specific location management function node, and may be an LMF measurement ID or in other forms;

Configuration information of positioning signal, which indicates the configuration of positioning signal under the positioning-related measurement ID, wherein the signal configuration may be SRS configuration or other information;

Type and time configuration of positioning signal, which is used to indicate whether the positioning signal is semi-persistent, aperiodic, or periodic, triggered time information of the positioning signal;

Requested signal transmission characteristics, which may be requested positioning signal transmission characteristics, or requested SRS signal transmission characteristics, etc. The transmission characteristics include information such as frequency resource and transmission period that signals may use;

Location management function node information, which may include ID information (such as routing ID) of the location management function node, and/or a transaction ID for positioning the UE, for the second node to find the corresponding location management function node, so that the second node exchange the positioning information with the location management function node;

Information for positioning activation, which includes a type of positioning signal and transmission time information of the positioning signal; or Information for positioning measurement request, indicating how to receive and measure positioning signals and how to report measurement results by the nodes selected for positioning, wherein this information may include a TRP measurement request list, a report configuration and/or a number of TRP measurements, and the TRP measurement request list may include information of gNB ID and/or Cell ID where the TRP is located.

Although specific examples of the retrieve UE context response message have been described above, the present disclosure is not limited thereto. For example, the retrieve UE context response message can be any message that responds to the retrieve UE context request message.

The second node receives the message and information, and the second node allocate a positioning signal configuration according to the received information and its own resource configuration. The signal configuration may be the same as the original positioning signal configuration, or may be a new positioning signal configuration, and the positioning signal configuration may be a first indication and/or a specific positioning signal configuration. The first indication is used to indicate that the positioning signal configuration is unchanged, the configuration may include information such as time-frequency resource and/or transmission mode of the transmitted signals, the configuration may be a configuration set including one or more signal configurations, and the UE may select a configuration in the configuration set to use according to the network indication.

The second node determines the positioning signal configuration of the UE under the second node. According to the received information, there are two processing situations.

In one example of Situation 1, if the information includes the positioning-related measurement ID, the second node checks whether the information has a measurement ID of the ongoing positioning measurement that matches the measurement ID in the received positioning measurement information, e.g., LMF measurement IDs are the same. If the measurement IDs are the same, it means that the second node is one of the nodes selected for positioning the UE. Instead of or in addition to measurement IDs being the same, the second node can also check whether the corresponding cell information and/or SRS configuration in the measurement are consistent with that in the positioning measurement related information received in step 503, and further confirm whether the second node is one of the nodes selected for the UE positioning. If the second node is one of the nodes selected for positioning the UE and/or the cell where TRP involved in positioning is located is a target cell for the UE handover, it means that the second node already has the positioning configuration information of the UE and is connected with the location management function node that manages the positioning of the UE. If the second node supports the current positioning signal configuration of the UE, that is, the second node can allocate the same positioning signal resources to the UE.

In one example of Situation 2, if the information includes the requested signal transmission characteristics or there is no matched positioning measurement in the second node, the second node can consider the requested signal transmission characteristics, decide a new positioning signal configuration of the UE under the second node, and transmit the new positioning signal configuration to the UE and/or the location management function node, and the second node can exchange an updated positioning signal configuration and/or information related to activating the positioning procedure with the location management function node, according to the location management function node information and/or UE information in the location management function node. The exchanged information can be exchanged through a path switch procedure or a non-UE-associated NRPPa transport procedure when the UE context has not been fully set up on the second node, so that the time of positioning interruption and the delay of positioning can be reduced.

In one example of Step 504, the second node transmits an RRC message to the UE. The RRC message may be an RRC release message, or an RRC resume message, or an RRC establishment message, etc. The message may include at least one of the following information:

First indication, which is used to indicate that the positioning signal configuration remains unchanged after the UE reselects to the second node; or Positioning signal configuration, which may be a new positioning signal configuration or an old positioning signal configuration.

Although specific examples of the RRC messages have been described above, the present disclosure is not limited thereto. For example, the RRC messages can be any message transmitted through the RRC signaling.

The UE receives and stores the message and information.

In one example of Step 505, the second node indicates, to the location management function node, the first node and/or the UE, that the positioning signal configuration of the UE is unchanged, and the second node can also indicate to the location management function node that the UE has moved to the second node and allocated the positioning signal for the UE by itself and the positioning signal remains unchanged. In this way, even if the UE moves to a new node, the positioning signal configuration of the UE can remain unchanged, and the location management function node can reselect the nodes selected for the positioning measurement for the UE according to the information provided by the second node, which avoids the interruption of positioning and reduces the positioning latency problem during mobility. According to the location management function node information in step 503, the second node transmits the location information update to the location management function node indicated in the location management function node information, wherein the information includes the UE ID and/or transaction ID to indicate the location management function node, and the updated positioning information. The positioning information update may be transmitted through a core network node, which may be an AMF.

The positioning information update may be included in an NG application protocol (NGAP) message, which may be a message related to path switch, such as a path switch request message, or a message related to the first NAS message for transmission to the UE, such as an initial UE message, or a message related to transmitting uplink non-UE associated NRPPa transport, etc., and the NGAP message may include at least one of the following information:

Location management function node's ID, such as routing ID, which is used to indicate, to the core network, to which location management function node the positioning information update is transmitted;

Transaction ID, which is used to indicate a specific positioning UE;

NRPPa PDU, which includes the positioning information update;

First indication, indicating to the location management function node that the positioning signal configuration information remains unchanged after the UE moves to a new node; or Positioning reference time indication, which is used to indicate, to the location management function node, positioning reference time of UE after arriving at the new node, which can system frame number (SFN) initialization time.

Although specific examples of NGAP messages have been described above, the present disclosure is not limited thereto.

After receiving the message including the location information update, the core network node transmits the location information update to the corresponding location management function node according to the ID information of the location management function node, and includes the transaction ID and/or the UE ID. The location management function node knows which UE's location information is updated according to the UE ID and/or transaction ID and selects a new location information configuration for the UE according to the updated location signal configuration (the configuration may include a signal configuration set).

In one example of Step 506, the location management function node transmits a location activation request to the second node, wherein the request is used to inform the UE which location signal configuration to use and starts signaling a positioning signal according to the configuration. The positioning activation request can be forwarded by the core network node. The positioning activation request may be included in the NGAP message, which may be a path switch acknowledgement message, or a connection release message, or a downlink non-UE-associated NRPPa transport message, etc. Although specific examples of NGAP messages have been described above, the present disclosure is not limited thereto.

The second node receives the message and obtains the positioning activation request.

In one example of Step 507, the second node transmits a positioning activation to the UE according to the positioning activation request received in step 506, wherein the positioning activation can be transmitted by a message of the MAC layer.

After receiving the positioning activation, the UE starts signaling the positioning signal according to a signal resource indicated in the activation, wherein the signal may be SRS.

In one example of Step 508, after the second node completes the positioning activation, the second node transmits the positioning activation response to the location management function node, the positioning activation response may be included in the NGAP message, which is first transmitted to the core network node, and then the core network node transmits the positioning activation response to the location management function node. The core network node may be an AMF. The NGAP message may be an uplink UE-associated NRPPa transport message, etc.

At steps 505 and 507, the information exchanged between the second node and the location management function node can be transmitted by a UE-associated NRPPa transport message or a non-UE-associated NRPPa message. If it is UE-associated, the message has to set up the UE context on the NGAP, after the UE set up the context, that is, before step 505.

In one example of Step 509, after the UE starts signaling the positioning signal, other nodes selected for positioning start receiving and measuring the positioning signal of the UE based on 4b the indication of the location management function node or the second node, and transmit the measurement results to the location management function node. The location management function node then calculates the location of the UE according to the measurement results and other related information.

If the second node indicates the positioning information configuration and measurement configuration of other nodes selected for UE positioning, the second node obtains the information of other nodes selected for positioning according to the information of gNB ID and/or Cell ID in the TRP request list in the information for the positioning measurement request obtained in step 503, and transmits the updated positioning signal configuration and activation configuration to other nodes. In this way, other nodes selected for the positioning can obtain the updated positioning signal configuration more quickly, so as to perform the positioning procedure more quickly.

In this way, after the UE reselects to a new cell or node, the UE can obtain a new positioning signal configuration more quickly, and the network can obtain the location information of the UE more quickly. At the same time, it also saves the signaling exchange between nodes and reduces the delay of positioning.

So far, the description of Embodiment 1 of a positioning configuration method of the present disclosure has been made. By this method, the UE can complete the positioning procedure more quickly in the handover or reselection procedure, which reduces the delay of positioning and signaling exchange between nodes, helps to apply the positioning results to other functions more quickly, and also reduces the power consumption of network equipment as well, thereby increasing the operator's income.

Figure 6:
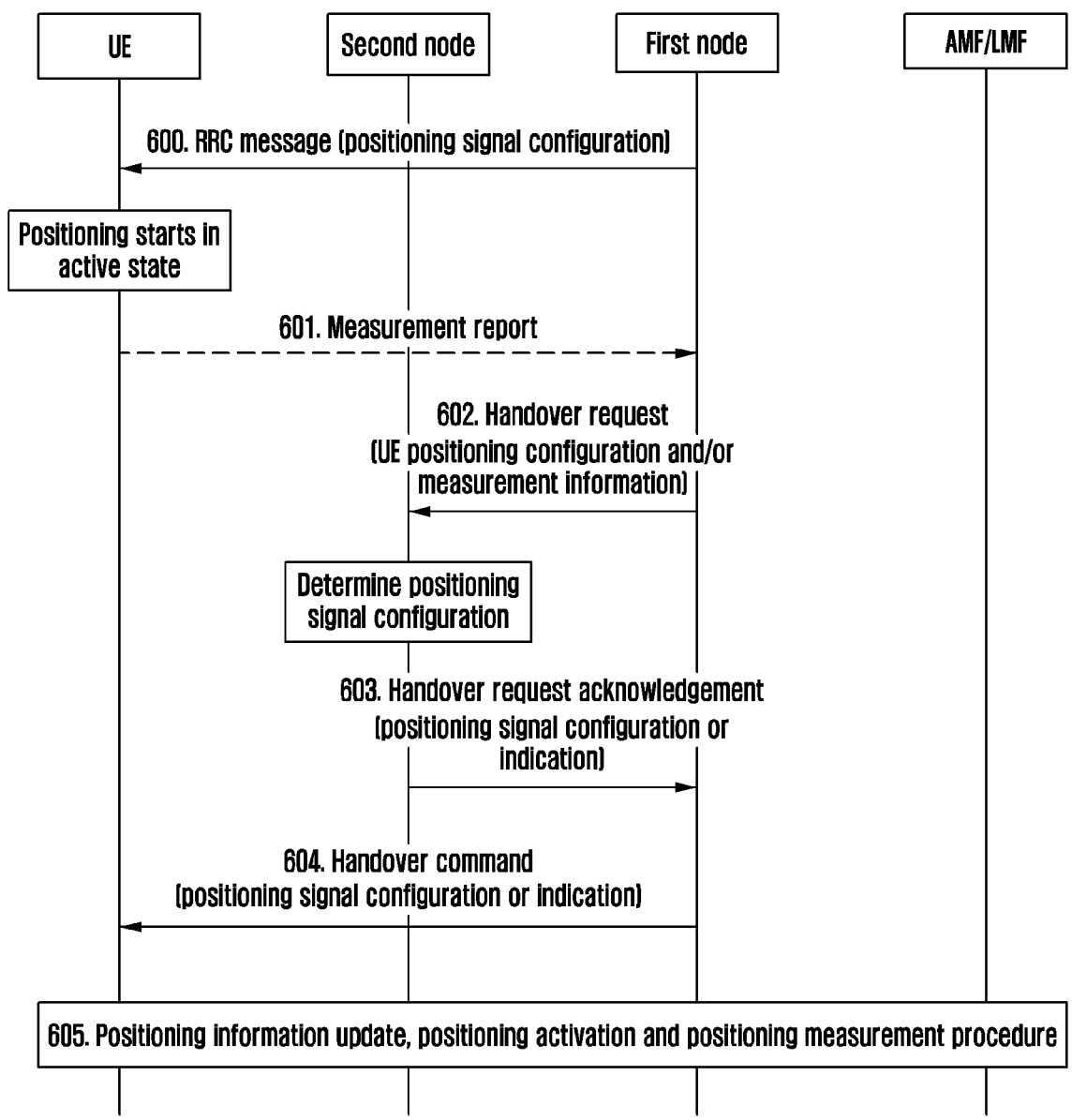
FIG. 6 illustrates a diagram of an Embodiment 2 of the positioning configuration method according to an embodiment of the present disclosure.

Embodiment 2 of a positioning configuration method of the present disclosure is shown in FIG. 6. A detailed description of steps irrelevant to the present disclosure is omitted here. The method includes the following steps.

In one example of Step 600, the first node transmits an RRC message to the UE, wherein the first node can be a base station, a CU or a CU-UP. The RRC message includes positioning signal configuration information, which can be the positioning signal configuration for the active state.

The UE receives the message and starts positioning in the active state.

In one example of Step 601, when the UE moves to the second node, which can be a base station, a CU or a CU-UP, the UE transmits a measurement report to the first node to indicate that the cell signal quality of the UE under the second node is better, or the first node decides to hand over the UE to the second node according to the strategy (such as load balancing, etc.).

In one example of Step 602, the first node transmits a handover request message to the second node, which may include at least one of the following information:
  Positioning-related measurement ID, which is used to indicate a positioning measurement at a specific location management function node, and may be an LMF measurement ID or in other forms;
  Configuration information of positioning signal, which indicates the configuration of positioning signal under the positioning measurement ID, wherein the signal configuration may be SRS configuration or other information;
  Type and time configuration of positioning signal, which is used to indicate whether the positioning signal is semi-persistent, aperiodic, or periodic, triggered time information of the positioning signal;
  Requested signal transmission characteristics, which may be requested positioning signal transmission characteristics, or requested SRS signal transmission characteristics, etc. The transmission characteristics include information such as frequency resource and transmission period that signals may use;
  Location management function node information, which may include ID information (such as routing ID) of the location management function node, and/or a transaction ID for positioning the UE, for the second node to find the corresponding location management function node, so that the second node can exchange the positioning information with the location management function node;
  Information for positioning activation, which includes a type of positioning signal and transmission time information of the positioning signal; or
  Information for positioning measurement request, indicating how to receive and measure positioning signals and how to report measurement results by the nodes selected for positioning, wherein this information may include a TRP measurement request list, a report configuration and/or a number of TRP measurements, and the TRP measurement request list may include information of gNB ID and/or Cell ID where the TRP is located.

The second node receives the message and information, and the second node generates a positioning signal configuration and/or a first indication according to the received information and its own resource configuration, wherein the signal configuration may include information such as time-frequency resource and/or transmission mode of the transmitted signals, and the configuration may be a configuration set including one or more signal configurations, and the UE may select a configuration in the configuration set to use according to the network indication. The first indication is used to indicate that the configuration of the positioning signal for the UE is unchanged. The details are as described two situations in step 503.

In one example of Step 603, the second node transmits a handover request acknowledgement message to the first node, which may include the positioning configuration or the first indication generated in step 602.

In one example of Step 604, the first node transmits a handover command message to the UE, wherein the message includes the positioning signal configuration and/or the first indication obtained in step 603.

The UE receives and stores the message and information.

In one example of Step 605, the positioning information update procedure is the same as described in step 505 of FIG. 5, the positioning activation is the same as described in steps 506 to 508 of FIG. 5, and the positioning measurement procedure is the same as described in step 509 of FIG. 5, which will not be described in detail here.

In this way, after the UE is handed over to a new cell or node, the UE can obtain the new positioning signal configuration more quickly, and the network can obtain the location information of the UE more quickly. At the same time, it also saves the signaling exchange between nodes and reduces the delay of positioning.

So far, the description of the second embodiment of a positioning configuration method of the present disclosure has been made. By this method, the UE can complete the positioning procedure more quickly in the handover or reselection procedure, which reduces the delay of positioning and signaling exchange between nodes, helps to apply the positioning results to other functions more quickly, and also reduces the power consumption of network equipment as well, thereby increasing the operator's income.

Figure 7:
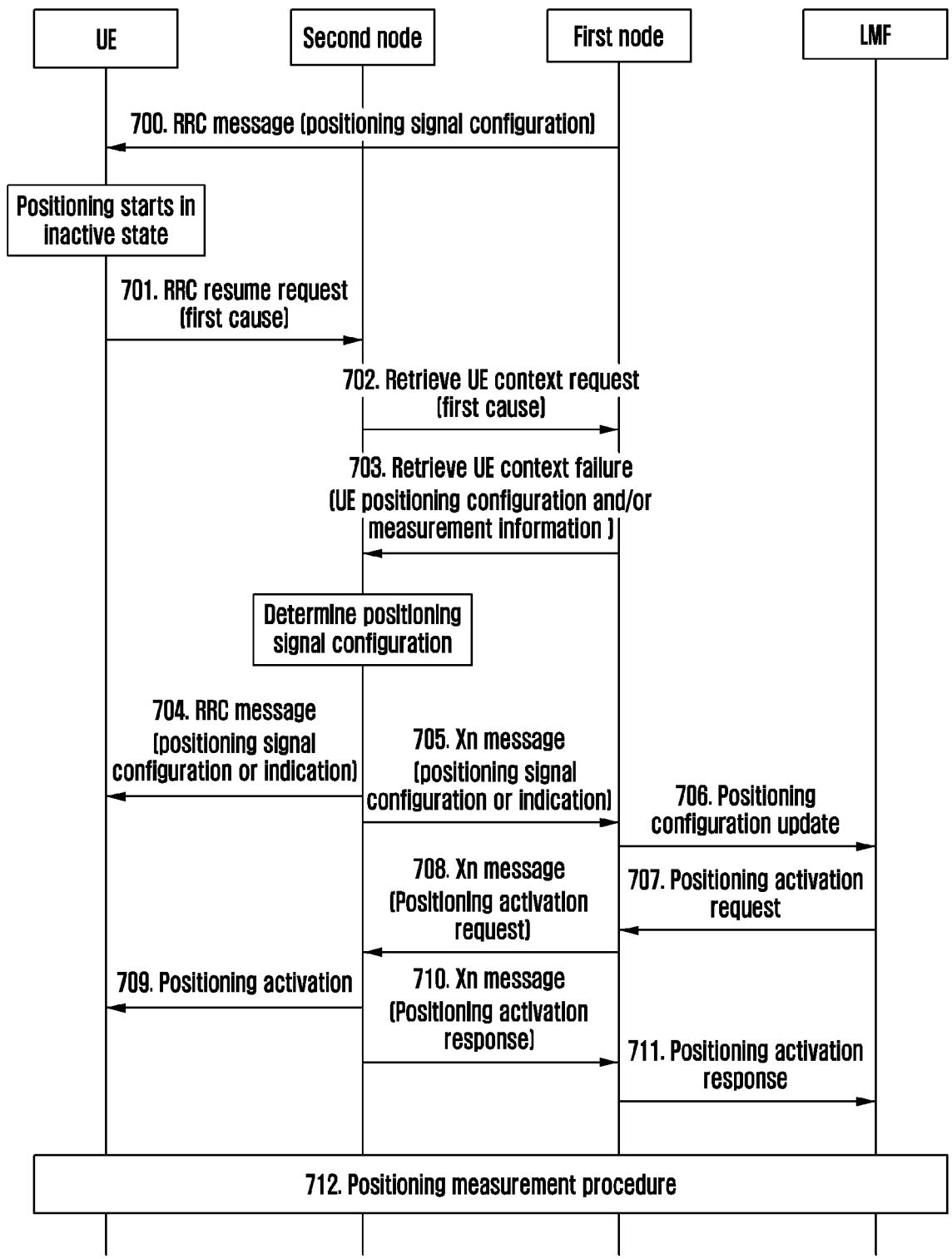
FIG. 7 illustrates a diagram of an Embodiment 3 of the positioning configuration method according to an embodiment of the present disclosure.

Embodiment 3 of a positioning configuration method of the present disclosure is shown in FIG. 7. A detailed description of steps irrelevant to the present disclosure is omitted here. The method includes the following steps.

Steps 700 to 702 are the same as described in steps 500 to 502 in FIG. 5 and will not be repeated here.

In one example of Step 703, the first node receives the information, the first node knows that the UE needs to be positioned in the inactive state, according to a first cause and a UE ID, and the first node transmits a retrieve UE context failure message to the second node, which may include at least one of the following information:
  Positioning-related measurement ID, which is used to indicate a positioning measurement at a specific location management function node, and may be an LMF measurement ID or in other forms;
  Configuration information of positioning signal, which indicates the configuration of positioning signal under the positioning measurement ID, wherein the signal configuration may be SRS configuration or other information;

Type and time configuration of positioning signal, which is used to indicate whether the positioning signal is semi-persistent, aperiodic, or periodic, triggered time information of the positioning signal;

Requested signal transmission characteristics, which may be requested positioning signal transmission characteristics, or requested SRS signal transmission characteristics, etc. The transmission characteristics include information such as frequency resource and transmission period that signals may use;

Information for positioning activation, which includes a type of positioning signal and transmission time information of the positioning signal; or Information for positioning measurement request, indicating how to receive and measure positioning signals and how to report measurement results by the nodes selected for positioning, wherein this information may include a TRP measurement request list, a report configuration and/or a number of TRP measurements, and the TRP measurement request list may include information of gNB ID and/or cell ID where the TRP is located.

Although specific examples of the retrieve UE context failure message have been described above, the present disclosure is not limited thereto.

The second node receives the message and information, and the second node allocates a positioning signal configuration and/or a first indication according to the received information and its own resource configuration, wherein the signal configuration may include information such as time-frequency resource and/or transmission mode of the transmitted signals, and the configuration may be a configuration set including one or more signal configurations, and the UE may select a configuration in the configuration set to use according to the network indication. The first indication is used to indicate that the configuration of the positioning signal for the UE is unchanged. The details are as described two situations in step 503.

In one example of Step 704, the second node transmits an RRC message to the UE, wherein the message includes the positioning signal configuration and/or the first cause generated in step 703. The RRC message may be an RRC release message, an RRC resume message, an RRC establishment message, etc. Although specific examples of the RRC messages have been described above, the present disclosure is not limited thereto.

The UE receives and stores the message and information.

In one example of Step 705, the second node transmits an Xn message to the first node, which may include the positioning signal configuration and/or the first indication, wherein the Xn message is a UE-associated Xn message, which may be transmitted by a retrieve UE context request message and/or a new Xn message, and the new Xn message may be a positioning information update message or other messages.

In one example of Step 706, the first node receives the message and the updated positioning signal configuration, and transmits a positioning configuration update message to the LMF, wherein the message includes the updated positioning signal configuration.

In one example of Step 707, the LMF receives the message and decides to activate the UE positioning, and the LMF transmits a positioning activation request to the first node. Because the first node knows that the UE is under the second node, the first node forwards the positioning activation request to the second node, and the positioning activation can be included in an Xn message, and the Xn message is a UE-associated Xn message, which can be a retrieve UE context failure message, and/or a new Xn message, wherein the new Xn message can be a positioning activation request message or other messages.

In one example of Step 709, the UE positioning activation is the same as described in step 507 and will not be repeated here.

In one example of Step 710, the second node transmits an Xn message to the first node, which may include a positioning activation response, wherein the Xn message is a UE-associated Xn message, which may be transmitted by a retrieve UE context request message and/or a new Xn message, and the new Xn message may be the positioning activation response or other messages.

In one example of Step 711, the first node receives the Xn message including the positioning activation response message and transmits the positioning activation response message to the LMF.

In one example of Step 712, the positioning measurement procedure is the same as described in step 509 of FIG. 5 and will not be described in detail here. In this way, after the UE reselects to a new cell or node, even if the UE fails to successfully set up the context on the new node, the UE can obtain a new positioning signal configuration, and the network can obtain the location information of the UE more quickly. For the UE performing the positioning function in the inactive state, the UE can also obtain the new positioning configuration without entering the connection establishment procedure or establishing the new connection, which reduces the delay of positioning and saves the power consumption of the UE and the network equipment.

So far, the description of Embodiment 3 of a positioning configuration method of the present disclosure has been made. With this method, the UE can obtain a new positioning configuration in the inactive state without entering the connection procedure or establishing a dedicated connection, and can complete the positioning in the inactive state, which can complete the positioning procedure more quickly, reduce the positioning latency and signaling exchange between nodes, help to apply the positioning results to other functions more quickly, and also reduce the power consumption of network equipment as well, thereby increasing the operator's income.

Figure 8:
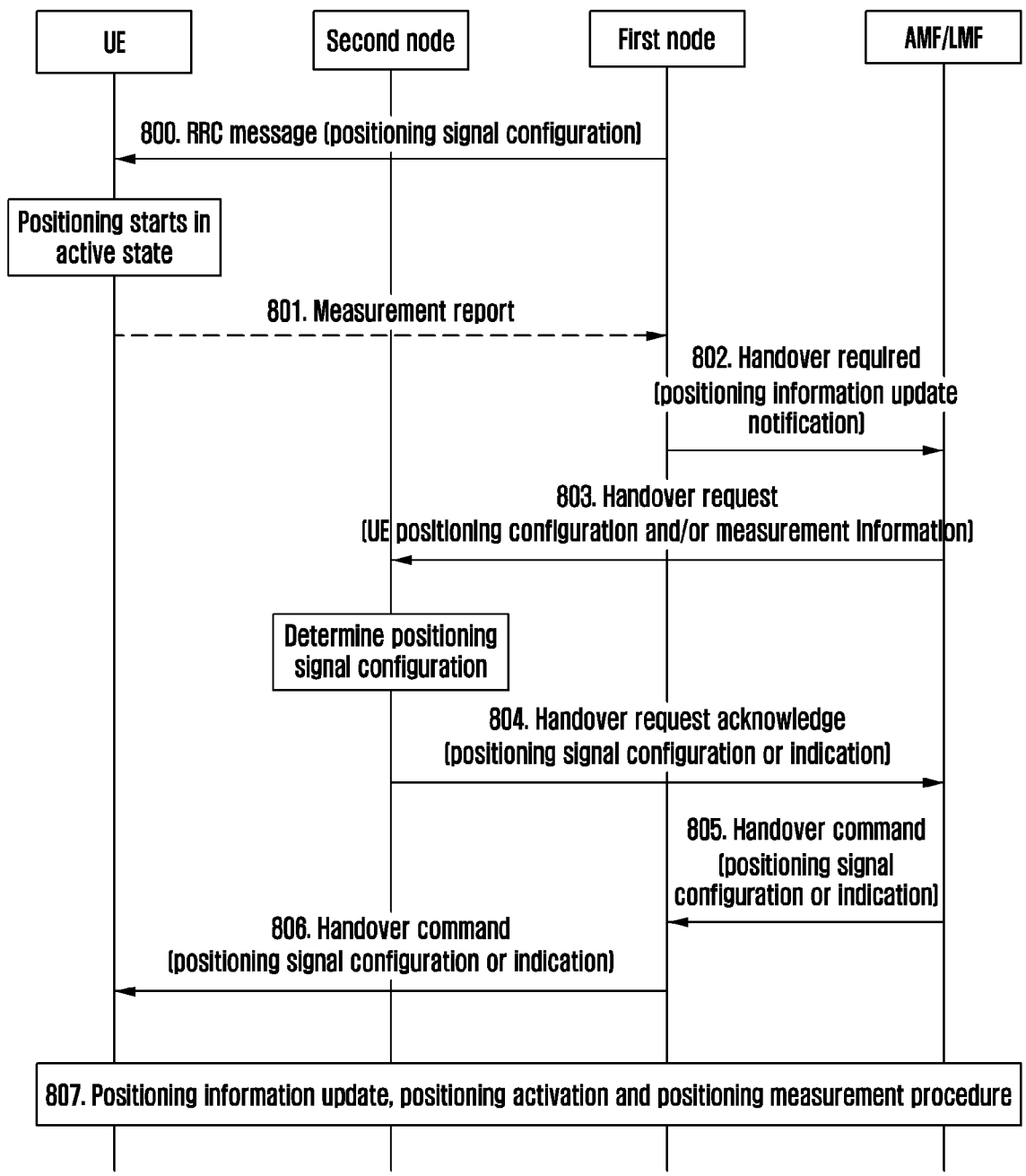
FIG. 8 illustrates a diagram of an Embodiment 4 of the positioning configuration method according to the embodiment of the present disclosure.

Embodiment 4 of a positioning configuration method of the present disclosure is shown in FIG. 8. A detailed description of steps irrelevant to the present disclosure is omitted here. The method includes the following steps:

Steps 800 to 801 are the same as described in steps 600 to 601 in FIG. 6 and will not be repeated here.

In one example of Step 802, the first node transmits a handover required message to the AMF, wherein the handover required message may include at least one of the following information:

Positioning-related measurement ID, which is used to indicate a positioning measurement at a specific location management function node, and may be an LMF measurement ID or in other forms;

Configuration information of positioning signal, which indicates the configuration of positioning signal under the positioning measurement ID, wherein the signal configuration may be SRS configuration or other information;

Type and time configuration of positioning signal, which is used to indicate whether the positioning signal is semi-persistent, aperiodic, or periodic, triggered time information of the positioning signal;

Requested signal transmission characteristics, which may be requested positioning signal transmission characteristics, or requested SRS signal transmission characteristics, etc. The transmission characteristics include information such as frequency resource and transmission period that signals may use;

Location management function node information, which may include ID information (such as routing ID) of the location management function node, and/or a transaction ID for positioning the UE, for the second node to find the corresponding location management function node, so that the second node can exchange the positioning information with the location management function node;

Positioning activation indication for indicating that the UE handed over by the AMF is performing the positioning procedure;

Information for positioning activation, which includes a type of positioning signal and transmission time information of the positioning signal; or Information for positioning measurement request, indicating how to receive and measure positioning signals and how to report measurement results by the nodes selected for positioning, wherein this information may include a TRP measurement request list, a report configuration and/or a number of TRP measurements, and the TRP measurement request list may include information of gNB ID and/or Cell ID where the TRP is located.

Although specific examples of the handover required message have been described above, the present disclosure is not limited thereto.

The AMF receives the message and information. If the message includes requested signal transmission characteristics, the AMF can directly include the information in the handover request message and transmit the handover request message to the second node. If the message does not include the requested signal transmission characteristics, but includes the positioning activation indication, the AMF can request the requested signal transmission characteristics from the LMF. The LMF transmits the requested signal transmission characteristic of the corresponding UE to the AMF, and the AMF includes the information in the handover request message to be transmitted to the second node.

In one example of Step 803, the AMF transmits the handover request message to the second node, which includes at least one of the following information obtained in step 802:

Positioning-related measurement ID, which is used to indicate a positioning measurement at a specific location management function node, and may be an LMF measurement ID or in other forms;

Configuration information of positioning signal, which indicates the configuration of positioning signal under the positioning measurement ID, wherein the signal configuration may be SRS configuration or other information;

Type and time configuration of positioning signal, which is used to indicate whether the positioning signal is semi-persistent, aperiodic, or periodic, and/or triggered time information of the positioning signal;

Requested signal transmission characteristics, which may be requested positioning signal transmission characteristics, or requested SRS signal transmission characteristics, etc. The transmission characteristics include information such as frequency resource and transmission period that signals may use; or Location management function node information, which may include ID information (such as routing ID) of the location management function node, and/or a transaction ID for positioning the UE, for the second node to find the corresponding location management function node, so that the second node can exchange the positioning information with the location management function node.

The second node receives the message and information, and the second node generates a positioning signal configuration and/or a first indication according to the received information and its own resource configuration, wherein the signal configuration may include information such as time-frequency resource and/or transmission mode of the transmitted signals, and the configuration may be a configuration set including one or more signal configurations, and the UE may select a configuration in the configuration set to use according to the network indication. The first indication is used to indicate that the configuration of the positioning signal for the UE is unchanged. The details are as described two situations in step 503.

In one example of Step 804, the second node transmits a handover request acknowledgement message to the AMF, which may include the new configuration generated in step 803.

In one example of Step 805, the AMF transmits a handover command message to the first node, which may include the new configuration generated in step 803.

Steps 806 to 807 are the same as described in steps 604 to 605 of FIG. 6 and will not be repeated here.

In this way, after the UE is handed over to a new cell or node, the UE can obtain the new positioning signal configuration more quickly, and the network can obtain the location information of the UE more quickly. At the same time, it also saves the signaling exchange between nodes and reduces the delay of positioning.

So far, the description of Embodiment 4 of a positioning configuration method of the present disclosure has been made. By this method, the UE can complete the positioning procedure more quickly in the handover or reselection procedure, which reduces the delay of positioning and signaling exchange between nodes, helps to apply the positioning results to other functions more quickly, and also reduces the power consumption of network equipment as well, thereby increasing the operator's income.

Figure 9:
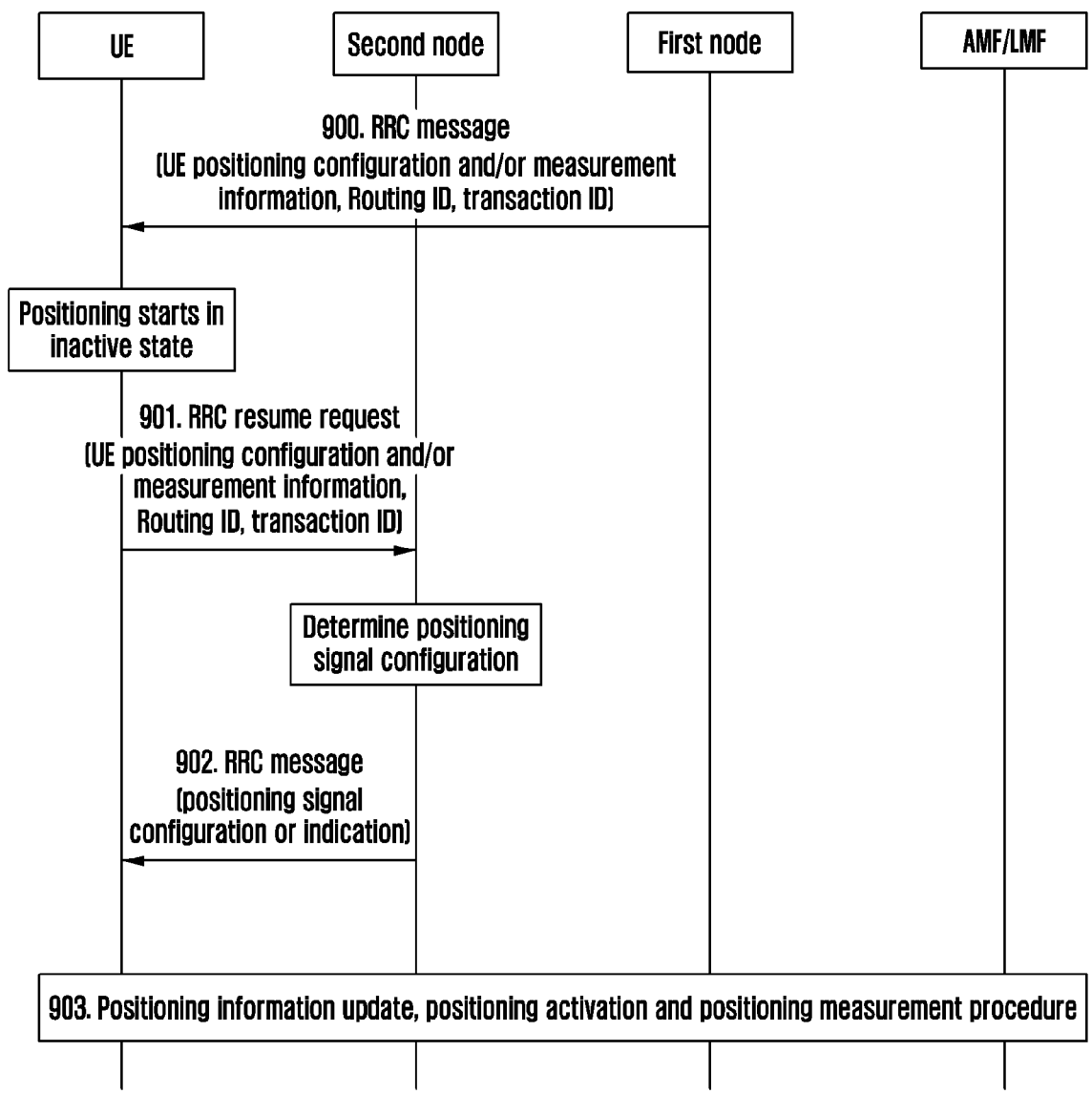
FIG. 9 illustrates a diagram of an Embodiment 5 of the positioning configuration method according to an embodiment of the present disclosure.

Embodiment 5 of a positioning configuration method of the present disclosure is shown in FIG. 9. A detailed description of steps irrelevant to the present disclosure is omitted here. The method includes the following steps.

In one example of Step 900, the first node transmits an RRC message to the UE, where the first node may be a base station serving the UE, a CU or a CU-CP, and the RRC message may be an RRC release message or an RRC reconfiguration message. The RRC message may include at least one of the following information:

Positioning-related measurement ID, which is used to indicate a positioning measurement at a specific location management function node, and may be an LMF measurement ID or in other forms;

Configuration information of positioning signal, which can be positioning signal configuration for the idle state or the inactive state;

Type and time configuration of positioning signal, which is used to indicate whether the positioning signal is semi-persistent, aperiodic, or periodic, the trigger time information of the positioning signal;

Requested signal transmission characteristics, which is used to indicate how the node serving the UE allocates the physical resources and transmission mode of the positioning signal/channel for the UE;

Routing ID, which is used to indicate an ID of the location management node; or

Transaction ID, which is used to indicate a transaction ID of positioning the UE in the location management node, and by which it is possible to know which specific UE is being positioned.

The UE enters the inactive state and starts the positioning in the inactive state.

Although specific examples of RRC messages have been described above, the present disclosure is not limited thereto.

In one example of Step 901, when the UE moves to the second node, the UE transmits an RRC resume request message to the second node, wherein the message can include a first cause which is used to indicate to the second node that the purpose of connection resume initiated by the UE is to support the positioning function in the inactive state. The message may also include information of the last serving node for the UE and an ID of the UE. The message may also include at least one of the following:

Positioning-related measurement ID, which is used to indicate a positioning measurement at a specific location management function node, and may be an LMF measurement ID or in other forms;

Configuration information of positioning signal, which indicates the configuration of positioning signal under the positioning measurement ID, wherein the signal configuration may be SRS configuration or other information;

Type and time configuration of positioning signal, which is used to indicate whether the positioning signal is semi-persistent, aperiodic, or periodic, triggered time information of the positioning signal; and Requested signal transmission characteristics, which is used to indicate how the node (i.e., the second node) serving the UE allocates the physical resources and transmission mode of the positioning signal/channel for the UE;

Routing ID, which is used to indicate an ID of the location management node; or

Transaction ID, which is used to indicate a transaction ID of positioning the UE in the location management node, and by which it is possible to know which specific UE is being positioned.

Although specific examples of the RRC resume request message have been described above, the present disclosure is not limited thereto.

The second node receives the message and information, and the second node generates a positioning signal configuration and/or a first indication according to the received information and its own resource configuration. The signal configuration may include information such as time-frequency resources and/or transmission modes of transmitted signals, and the configuration may be a configuration set containing one or more signal configurations, and the UE may select a configuration in the configuration set to use according to the network indication. The first indication is used to indicate that the configuration of the positioning signal for the UE is unchanged. The details are as described two situations in step 503.

Step 902 is the same as described in step 504 in FIG. 5 and will not be repeated here.

Step 903 is the same as described in steps 705 to 712 in FIG. 7 or steps 505 to 509 in FIG. 5 and will not be repeated here.

In this way, after the UE reselects to a new cell or node, the newly accessed node can also obtain a new positioning signal configuration without the context retrieve from the last node serving for the UE, and the network can obtain location information of the UE more quickly. For the UE performing the positioning function in the inactive state, the new positioning configuration can also be obtained without entering the connection establishment procedure or establishing a new connection, which reduces the delay of positioning and saves the power consumption of the UE and the network equipment.

So far, the description of Embodiment 5 of a positioning configuration method of the present disclosure has been made. With this method, the UE can obtain a new positioning configuration in the inactive state without entering the connection procedure or establishing a dedicated connection, and can complete the positioning in the inactive state, which can complete the positioning procedure more quickly, reduce the delay of positioning and signaling exchange between nodes, help to apply the positioning results to other functions more quickly, and also reduce the power consumption of network equipment as well, thereby increasing the operator's income.

Figure 10:
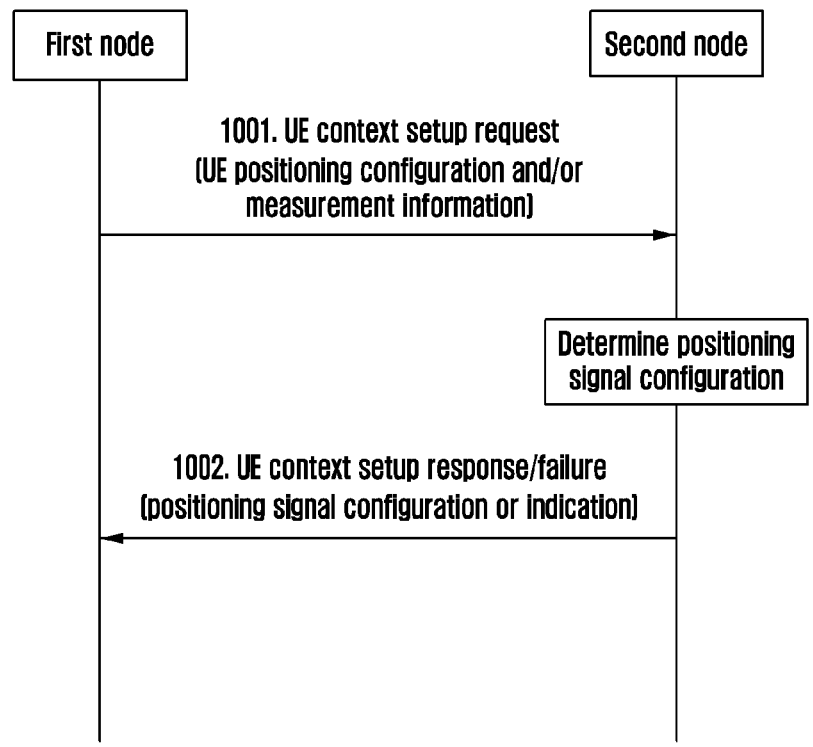
FIG. 10 illustrates a diagram of an Embodiment 6 of the positioning configuration method according to the embodiment of the present disclosure.

Embodiment 6 of a positioning configuration method of the present disclosure is shown in FIG. 10. A detailed description of steps irrelevant to the present disclosure is omitted here. The method includes the following steps:

In one example of Step 1001, the first node transmits a UE context setup request message to the second node, wherein the first node can be a CU or a CU-CP and the second node can be a DU, and the second node decides allocation of physical resources. The message may include at least one of the following information:

Positioning-related measurement ID, which is used to indicate a positioning measurement at a specific location management function node, and the ID may be an LMF measurement ID or in other forms;

Configuration information of positioning signal, which indicates the configuration of positioning signal under the positioning measurement ID, wherein the signal configuration may be SRS configuration or other information;

Type and time configuration of positioning signal, which is used to indicate whether the positioning signal is semi-persistent, aperiodic, or periodic, triggered time information of the positioning signal; or Requested signal transmission characteristics, which may be requested positioning signal transmission characteristics, or requested SRS signal transmission characteristics, etc. The transmission characteristics include information such as frequency resource and transmission period that signals may use.

Although specific examples of the UE context setup request message have been described above, the present disclosure is not limited thereto.

The second node receives the message and information, and the second node generates a positioning signal configuration and/or a first indication according to the received information and its own resource configuration, wherein the signal configuration may include information such as time-frequency resources and/or transmission modes of the transmitted signals, and the configuration may be a configuration set including one or more signal configurations, and the UE may select a configuration in the configuration set to use according to the network indication. The first indication is used to indicate that the configuration of the positioning signal for the UE is unchanged. The details are as described two situations in step 503.

In one example of Step 1002, the second node transmits, to the first node, a UE context setup response message or a UE context setup failure message, wherein the message may include a new positioning signal configuration. Although specific examples of the UE context setup response message and the UE context setup failure message have been described above, the present disclosure is not limited thereto.

After receiving the message and information, the first node may continue to transmit the new positioning signal configuration to UE or other nodes which may be location management function nodes to complete other positioning procedures.

In this way, after the UE reselects to a new cell or node, even in a separate architecture, the UE can obtain the new positioning signal configuration more quickly, and the network can obtain the location information of the UE more quickly. At the same time, it also saves the signaling exchange between nodes and reduces the positioning latency.

So far, the description of Embodiment 6 of a positioning configuration method of the present disclosure has been made. By this method, the UE can complete the positioning procedure more quickly even in the handover or reselection procedure, even under the separation architecture, which reduces the positioning latency and signaling exchange between nodes, helps to apply the positioning results to other functions more quickly, and can also reduce the power consumption of network equipment, thereby increasing the operator's income.

Figure 10A:
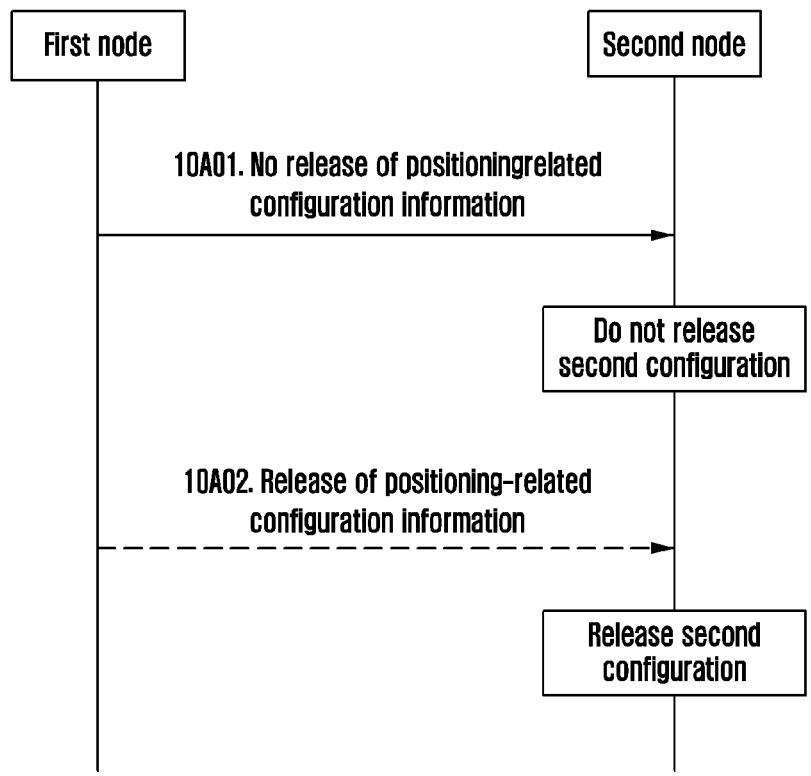
FIG. 10A illustrates a diagram of an Embodiment 6A of the positioning configuration method according to the embodiment of the present disclosure.

Embodiment 6A of a positioning configuration method of the present disclosure is shown in FIG. 10A. A detailed description of steps irrelevant to the present disclosure is omitted here. The method includes the following steps.

In one example of Step 10A01, when the UE served by the first node is ready to enter the inactive state, if the UE is configured with the positioning measurement in the inactive state or idle mode, the first node transmits, to the second node, information for indicating not to release the positioning-related configuration information. The first node may be a CU or a base station, and the second node may be a DU or a UE. The positioning-related configuration information may be positioning-related configuration information in the inactive or idle mode, which may be configuration information for an uplink positioning reference signal, configuration information for SRS or configuration information for PRACH, or configuration information for transmitting an uplink positioning reference signal.

If the first node is a CU and the second node is a DU, the information for indicating not to release the positioning-related configuration information may be transmitted by a UE context release command message or a UE context modification request message, or by other messages for indicating not to release the positioning-related configuration information. If the first node is a base station and the second node is a UE, the information for indicating not to release the positioning-related configuration information can be transmitted by an RRC release message or other RRC messages. It should be understood that although the above names of messages for transmitting the information for indicating not to release the positioning-related configuration information is given for the purpose of explanation, this does not mean that it is limiting, but other messages can also be used to transmit the information without departing from the scope of the present disclosure.

The message including the information for indicating not to release the positioning-related configuration information may include at least one of the following:

Indication of not releasing positioning-related configuration, which is used to indicate, to the second node, not to release the positioning-related configuration. Even if the UE enters the inactive state and idle mode, the second node would reserve the relevant configuration for the UE; or Condition information for releasing positioning-related configuration, which is used to indicate, to the second node, the reservation condition for the positioning-related configuration, which can be a time condition or an event condition. If the condition is a time condition, for example, the condition can be a specific time to reserve the positioning-related configuration, which can be an absolute time or a relative time, and when the time condition is met, the second node can release or not reserve the positioning-related configuration; and if the condition is an event condition, the event condition can be that when the second node hasn't received any signal transmitted from the UE according to the positioning-related configuration, or when the second node hasn't received any signal transmitted from the UE according to the positioning-related configuration for a certain number of times, or the second node hasn't received any signal transmitted from the UE according to the positioning-related configuration within a certain period of time, the second node can consider that the UE has left the coverage of the second node and the second node can release the positioning-related configuration.

After receiving the information for indicating not to release the positioning-related configuration information, the second node decides whether to release the positioning-related configuration according to the indication and/or conditions of the information.

In one example of Step 10A02, when the first node receives an indication related to release of the positioning-related configuration, the first node transmits, to the second node, relevant information for indicating the release of the positioning-related configuration.

For the indication related to release of the positioning-related configuration, the indication may include the following situations:

the LMF stops the configuration procedure related to positioning, for example, LMF decides to stop the positioning measurement of UE in the inactive or idle state, and the LMF informs the first node to stop the configuration procedure related to positioning, so the first node needs to transmit, to the second node, information for indicating release of the positioning-related configuration; and the UE moves to a new serving node, which may be a base station, or a child node under the first node, such as a DU that is different from the second node. The new serving node informs the first node the change of the serving node or the change of serving cell of the UE or the change of the positioning-related configuration context, so the first node needs to transmit, to the second node, information for indicating release of the positioning-related configuration.

If the first node is a CU and the second node is a DU, the information for indicating release of the positioning-related configuration is transmitted through the UE context release command message or the UE context modification request message, or transmitted through other messages for indicating to release the positioning-related configuration information. If the first node is a base station and the second node is a UE, the information for indicating to release the positioning-related configuration information can be transmitted by an RRC release message or a system message, or by other RRC messages. It should be understood that although the above names of messages for transmitting the information for indicating the release of the positioning-related configuration information is given for the purpose of explanation, this does not mean limiting, but other messages can also be used to transmit the information without departing from the scope of the present disclosure. The information for indicating the release of the positioning-related configuration may include at least one of the following items:

Indication to release the positioning-related configuration, which is used to indicate, to the second node, to release the positioning-related configuration, that is, the second node does not reserve the related configuration for the UE.

It should be noted that after the positioning-related configuration is not released or reserved, the second node can decide whether to release or continue to reserve the positioning-related configuration according to the condition information for releasing positioning-related configuration in step 10A01 or the indication to release the positioning-related configuration in step 10A02.

In this way, it can be ensured that when the UE enters the inactive state or idle mode, the node serving the UE can always reserve the configuration information needed for positioning for the UE, so as to ensure the successful completion of positioning. Because the positioning-related configuration retained by the serving node for the UE will not be assigned to other UE, thus avoiding the interference between users, and thus better realizing the positioning function in the inactive state or the idle mode.

So far, the description of Embodiment 6A of a positioning configuration method of the present disclosure has been made. With this method, the UE can successfully complete the positioning procedure in the inactive or idle state, even in the separated architecture, avoiding the interruption of positioning, avoiding the interference problem as well, improving the positioning accuracy, helping to apply positioning results to other functions more quickly, and reducing the power consumption of network equipment, thereby increasing the operator's income.

Figure 10B:
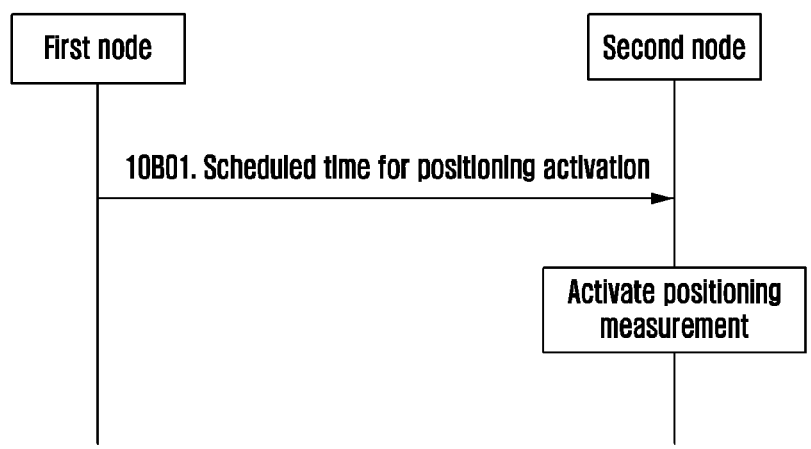
FIG. 10B illustrates a diagram of an Embodiment 6B of the positioning configuration method according to the embodiment of the present disclosure.

Embodiment 6B of a positioning configuration method of the present disclosure is shown in FIG. 10B. A detailed description of steps irrelevant to the present disclosure is omitted here. The method includes the following steps.

In one example of Step 10B01, the first node transmits, to the second node, relevant information for indicating a scheduled time of positioning activation. The first node may be a CU, or a UE, or a base station, or a core network node, and the second node may be a DU, or a base station, or a core network node. That is, the possible situations include the following: the CU transmits, to the DU, relevant information for indicating the scheduled time of positioning activation; or, the UE transmits, to the base station, relevant information for indicating the scheduled time of positioning activation; or, the first base station transmits, to the second base station, relevant information for indicating the scheduled time of positioning activation, that is, the source base station transmits, to the target base station, relevant information for indicating the scheduled time of positioning activation in the handover procedure; or, in the handover procedure, the base station transmits, to the core network node, relevant information for indicating the scheduled time of positioning activation; or, in the handover procedure, the core network node transmits, to the base station, relevant information for indicating the scheduled time of positioning activation. The relevant information for indicating the scheduled time of positioning activation may be generated by the first node itself or received by the first node from other nodes which may be LMFs, base stations or core network nodes.

If the first node is a CU and the second node is a DU, the relevant information for indicating the scheduled time of positioning activation can be transmitted by a positioning measurement request message, or other messages for relevant information for indicating the scheduled time of positioning activation.

If the first node is a UE and the second node is a base station, the relevant information for indicating the scheduled time of positioning activation can be transmitted by an RRC message for the relevant information for indicating the scheduled time of positioning activation.

If the first node is the first base station and the second node is the second base station, the relevant information for indicating the scheduled time of positioning activation can be transmitted by a handover request message or a UE context response message, or by other messages for the relevant information for indicating the scheduled time of positioning activation.

If the first node is a base station and the second node is a core network node, the relevant information for indicating the scheduled time of positioning activation can be transmitted by a handover required message, or other messages for the relevant information for indicating the scheduled time of positioning activation.

If the first node is a core network node and the second node is a base station, for the relevant information for indicating the scheduled time of positioning activation can be transmitted by a handover request message or other messages for the relevant information for indicating the scheduled time of positioning activation.

It should be understood that although the above names of the messages for the relevant information for indicating the scheduled time of positioning activation have been given for the purpose of explanation, this does not mean that it is limiting, but other messages can also be used to transmit the information without departing from the scope of the present disclosure. The message including relevant information for indicating the scheduled time of positioning activation may include at least one of the following:

Scheduled time, which is used to indicate time for activating positioning measurement, according to which the nodes selected for positioning start positioning measurement.

After receiving the relevant information for indicating the scheduled time of positioning activation, the second node decides whether to start the positioning related measurement according to the scheduled time.

In this way, it can be ensured that all the nodes selected for the positioning can receive the scheduled time for activating the positioning, and when the scheduled time is reached, the measurement can be started at the same time. With this method, the measurement configuration can be transmitted to the nodes selected for the positioning in advance, and the nodes selected for the positioning can start the positioning measurement according to the scheduled time, thus reducing the delay of positioning procedure, and also ensuring that all nodes selected for the positioning can start the positioning measurement at the same time when the UE is in the mobile state or in the inactive or idle mode, thus ensuring the successful completion of the positioning procedure and reducing the delay of positioning.

So far, the description of Embodiment 6B of a positioning configuration method of the present disclosure has been made. By this method, the UE can also ensure that all nodes selected for positioning can obtain the scheduled time of positioning activation under various conditions such as in the service under the separated architecture, or during UE mobility, or the UE being in the inactive or idle mode, so that all nodes selected for positioning can start positioning measurement at the same time, thus reducing the delay of positioning, ensuring the successful execution of positioning, and applying the positioning results to various network functions more quickly, thus increasing the operator's income.

Figure 15:
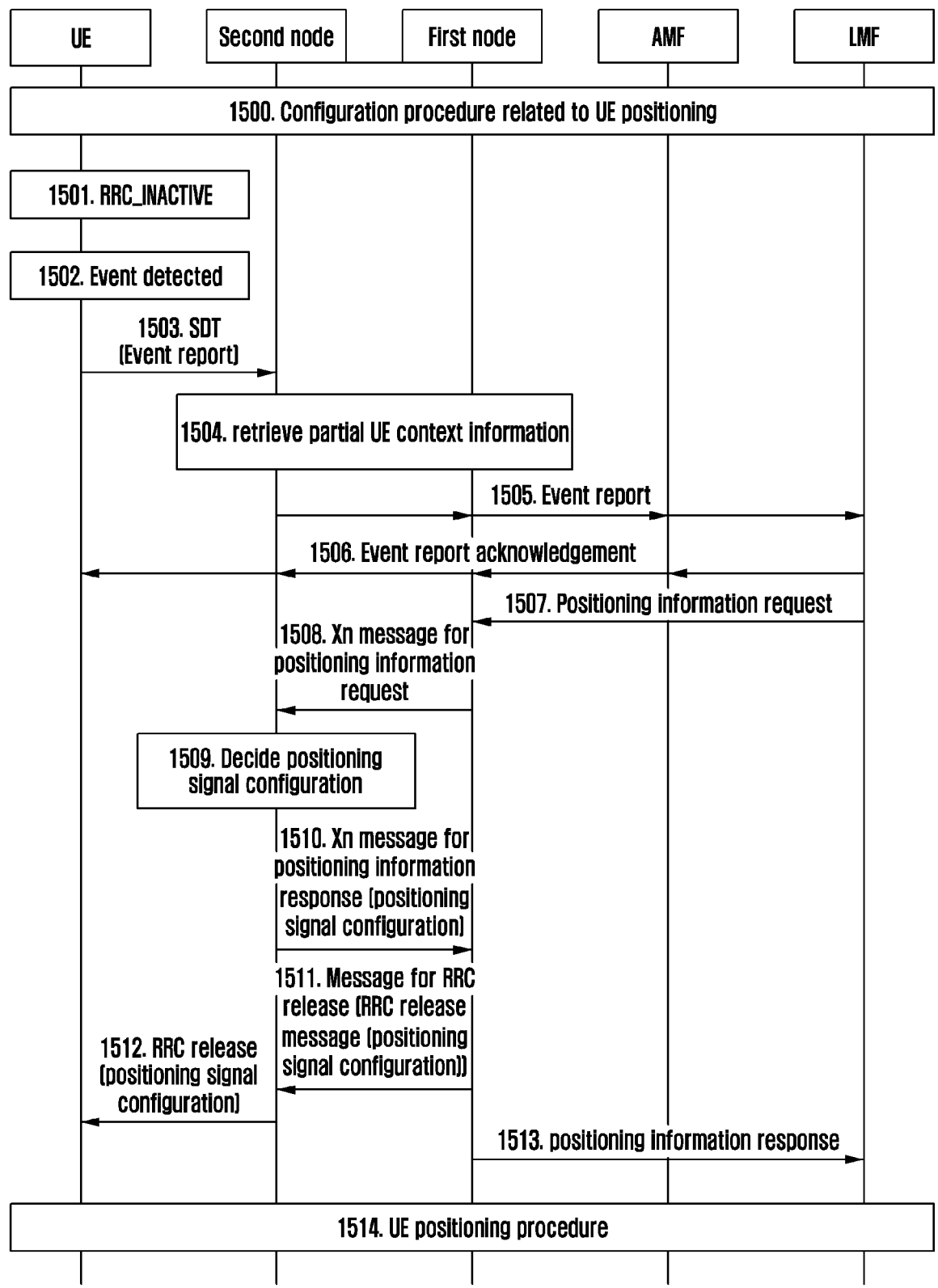
FIG. 15 illustrates a flow chart of an Embodiment 7 of another positioning configuration method according to an embodiment of the present disclosure.

Embodiment 7 of a positioning configuration method of the present disclosure is shown in FIG. 15. A detailed description of steps irrelevant to the present disclosure is omitted here. The method includes the following steps.

In one example of Step 1500, the LMF initiates, to the UE, a configuration procedure related to the UE positioning through the AMF and the first node, wherein the first node can be a base station, and the first node is a node with UE context and can be considered as the anchor node of UE. According to an embodiment, the configuration procedure related to the UE positioning can be consistent with step 1 to step 21 in the deferred mobile terminated location request (deferred MT-LR) procedure for periodic or triggered location events in the 3GPP communication standard. It should be understood that the above embodiment is merely an example, and the configuration procedure related to the UE positioning is not limited thereto.

In one example of Step 1501, UE enters RRC_INACTIVE state. The UE is configured to transmit related configuration of data and signaling in RRC_INACTIVE or RRC_IDLE state. According to an embodiment, the related configuration of data and signaling transmitted in RRC_INACTIVE or RRC_IDLE state may be configuration of small data transmission (SDT), which is used for a small amount of data transmission or signaling transmission. It should be understood that the above embodiment is merely an example, and the related configuration for transmitting data and signaling in RRC_INACTIVE or RRC_IDLE state is not limited thereto.

In one example of Step 1502, for the UE that successfully performs the periodic or triggered location request in step 1500, the UE monitors occurrence of the trigger event or periodic event requested in step 1500.

In one example of Step 1503, if a specific event is triggered or the timer expires, the UE transmits an event report to the network (such as LMF or AMF), which can be transmitted to the second node through the SDT. The second node can be a base station, which is the node currently serving the UE and can be considered as a non-anchor node.

In one example of Step 1504, the second node initiates the procedure of the retrieve UE context to the first node. In the step, the first node decides the UE without context relocation, that is, the UE context remains at the first node. In this step, the first node can transmit partial UE context information to the second node, which is used to transmit data and/or signaling in the SDT to the core network.

In one example of Step 1505, the second node transmits a message including the event report received in step 1503 to the first node according to the partial UE context information obtained in step 1504, the first node transmits a non access stratum (NAS) message including the event report to the AMF, and the AMF transmits the event report to the LMF.

In one example of Step 1506, when the LMF receives the event report, if the LMF can process the event report, the acknowledge for the event report is sent back to the UE through the AMF, the first node and the second node, wherein the event report acknowledge can be transmitted from the second node to the UE through the downlink SDT.

In one example of Step 1507, if the event report requires location estimation, the LMF may perform one or more positioning procedures. If the positioning procedure includes an uplink (UL) or uplink+downlink (UL+DL) positioning procedure, the LMF transmits a positioning information request message to the first node.

In one example of Step 1508, if the first node knows that the UE is currently served by the second node (for example, the first node can know it at step 1504), the first node transmits a message for positioning information request to the second node. In an embodiment, the message may be an XnAP message related to the UE, which may be a positioning information request message or other XnAP messages. The above is merely an example, and the message for positioning information request is not limited thereto. The second node receives the message.

In one example of Step 1509, if information related to UE positioning configuration is included in the positioning request message received in step 1508, the second node may use the information related to the UE positioning configuration to configure a positioning signal for the UE. In an embodiment, configuration information related to the UE positioning may be requested SRS transmission characteristics or configured SRS transmission information. The above is merely an example, and the information related to the UE positioning configuration is not limited thereto.

In one example of Step 1510, the second node transmits a message for positioning information response to the first node. The message may include positioning signal configuration information configured by the second node for the UE. The positioning signal configuration information is transmitted to the UE by the second node, but because the second node does not have all context of the UE, the second node cannot assemble the RRC message transmitted to the UE (for example, encrypt and protect the integrity of the RRC message). The second node needs to transmit the positioning signal configuration information of the UE to the first node, and the first node includes the positioning signal configuration information in the RRC message and transparently transmits the RRC message to the UE through the second node. In an embodiment, the positioning signal configuration information is configuration related to the physical resources of how the UE transmits an uplink positioning signal under the second node, for example, the positioning signal configuration information can be the time-frequency resource configuration, spatial relation configuration and/or system frame number initialization time of the positioning signal. In an embodiment, the message may be a UE-associated XnAP message, which may be a positioning information response message, or other XnAP messages. The above is merely an example, and the message for transmitting the positioning information response is not limited thereto. Step 1511: the first node transmits a message including RRC release message to the second node, where the message including RRC release message may be a retrieve UE context response message, a retrieve UE context failure message, a UE context release message, or a new XnAP message. It should be understood that the above is merely an example, and the message including the RRC release message are not limited thereto.

According to one or more embodiments, the message including the RRC release message may include the following information:

RRC container, in which an RRC release message assembled by the first node is included, and the RRC release message includes the positioning signal configuration of the UE under the second node received in step 1510.

In one example of Step 1512: the second node transparently transmits the RRC release message in the RRC container in the message to the UE. The UE transmits the positioning signal according to positioning signal configuration included in the received RRC release message.

In this way, the UE can obtain the positioning signal configuration transmitted from the non-anchor node (i.e., the base station currently serving the UE) without changing the anchor node (i.e., without UE context relocation), wherein the non-anchor node means that there is no signaling connection related to the UE between the node and the core network, and/or there is no complete UE context information.

Wherein steps 1511 and 1512 can occur before step 1513 or after step 1513.

In one example of Step 1513, the first node transmits a positioning information response message to the LMF, where the positioning information response message includes the positioning signal configuration of the UE under the second node obtained in step 1510.

In one example of Step 1514, the UE positioning procedure is performed.

So far, the description of a positioning configuration method of the present disclosure has been made. By this method, it can be supported to configure signals to the UE under the condition that the anchor node of the UE is unchanged and the state is unchanged, that is, to transmit the positioning signal configuration information of the non-anchor node to the UE, which enables the positioning procedure to be completed more quickly, reduces the positioning latency and signaling exchange between nodes, helps to apply positioning results to other functions more quickly, and also reduces the power consumption of network equipment, thereby increasing the operator's income.

Figure 11:
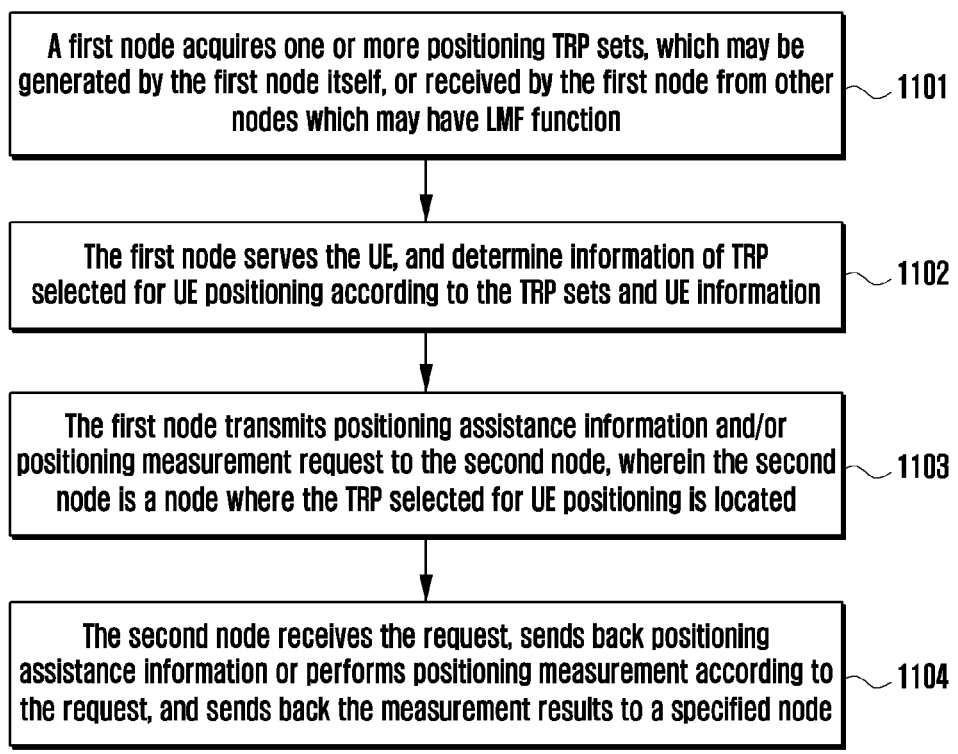
FIG. 11 illustrates a flowchart of another positioning configuration method according to an embodiment of the present disclosure.

Another method of the positioning configuration method of the present disclosure is shown in FIG. 11. A detailed description of steps irrelevant to the present disclosure is omitted here. The method includes the following steps.

In one example of Step 1101, a first node acquires information related to candidate positioning reference points. The positioning reference point refers to a positioning signal transmission and reception point for positioning the UE, which may be an antenna on the base station, and also may be called TP or TRP. The candidate positioning reference point may be one or more positioning TRP sets, and the TRP is a positioning reference point for positioning. The one or more positioning TRP sets may include one or more candidate positioning TRPs (i.e., candidate positioning reference points) for selecting TRPs selected for positioning. The candidate positioning TRP set may be generated by the first node itself or received by the first node from other nodes. The first node may be a base station, and the other nodes may be base stations or nodes with the LMF function.

In the one or more positioning candidate TRP sets, each candidate positioning TRP set may include at least one of the following information:

Scope information, which is used to indicate a specific positioning scope, which may be the coverage range, time range or the response of positioning quality requirements. If the scope information is a coverage range, the range may be a cell coverage range, and the scope information may be Cell ID (such as cell global identifier (CGI), E-UTRAN CGI (ECGI), etc.); Or, the scope information is a coverage range of SSB beam in a cell, and the scope information may be Cell ID (such as CGI, ECGI, etc.)+SSB beam index; Or, the scope information is a position coordinate range. Although specific examples of scope information have been described, the present disclosure is not limited thereto; or One or more TRP lists, each indicating information of the TRPs involved in positioning, which includes one or more TRP information, and each TRP information includes at least one of the following information:
(1) gNB ID indicating the base station where the TRP is located;
(2) Cell ID indicating the cell where the TRP is located, which may be CGI or ECGI;
(3) TRP ID indicating a specific TRP under the base station; or
(4) Positioning assistance information indicating positioning assistance information on the TRP, such as information like configuration of the positioning reference signal.

The candidate positioning TRP set may be per UE or per node.

If the candidate positioning TRP set is per UE, the candidate positioning TRP set can be a TRP list to be used for positioning the UE or later. For example, the base station can decide which TRP list the UE disclosure use at the corresponding time according to the time information in the scope information.

If the candidate positioning TRP set is per node, when there are multiple TRP lists, each list has a priority indication, which may be implicit, for example, the order of the lists is a default priority order (for example, the top in the order means the high priority, or the bottom in the order means the high priority), or which may be direct, for example, the priority is expressed by the number (for example, the larger the number, the higher the priority or the smaller the number, the higher the priority).

Although specific examples of information related to candidate positioning reference points (for example, candidate positioning TRP set) have been described above, the present disclosure is not limited thereto, and any form of information related to candidate positioning reference points can be adopted.

The first node generates or derives the positioning TRP set according to TRP information and/or other assistance information sent back by one or more base stations.

In one example of Step 1102, The location management function node transmits a positioning information request to the first node, to request to position the UE under the first node. If the candidate positioning TRP set is per UE, the first node can determine a list of TRPs selected for positioning the UE at this moment according to the ID of the UE and/or other information.

If the candidate location TRP set is per node, the first node compares the current location information of the UE (such as information of the cell where the UE is located and/or SSB beam index) with the location area information in the TRP set received in step 1101, and if the location of the UE is within the location area, the first node decides to use the TRP in the TRP list corresponding to the location area to position the UE. If there are multiple TRP lists that meet the location area condition when the first node selects the positioning TRP set, the first node may select the positioning TRP list according to its own strategy and/or the list priority.

In one example of Step 1103, the first node transmits a request for positioning assistance information and/or a request for positioning measurement to the second node, which may be, for example, a base station, which is a node corresponding to gNB ID or Cell ID in the TRP list in the used positioning TRP set determined in step 1103.

The first node transmits the obtained assistance information to the UE, and/or the first node transmits the positioning signal configuration to the UE and/or the second node, and simultaneously activates positioning, that is, the positioning measurement procedure begins.

In this way, the node serving the UE may obtain the alternative positioning TRP scheme and/or assistance information in advance, and at the beginning of positioning, the TRP selected for the positioning may be decided directly according to the current location information of the UE, and there is no need to exchange positioning information with the LMF, thus reducing the delay of positioning and the load of signaling exchange.

If the UE is moving, the first node may directly transmit positioning measurement information to the nodes selected for UE positioning, thus avoiding positioning interruption caused by handover or reselection and reducing the positioning latency and signaling exchange in the positioning procedure.

So far, the description of a positioning configuration method of the present disclosure has been made. By this method, the node serving the UE can obtain the positioning-related assistance information before the beginning of the positioning procedure, thus reducing the delay of positioning, accelerating the positioning procedure, reducing the extra signaling overhead, and completing the positioning procedure more quickly under a more energy-saving scheme.

Figure 12:
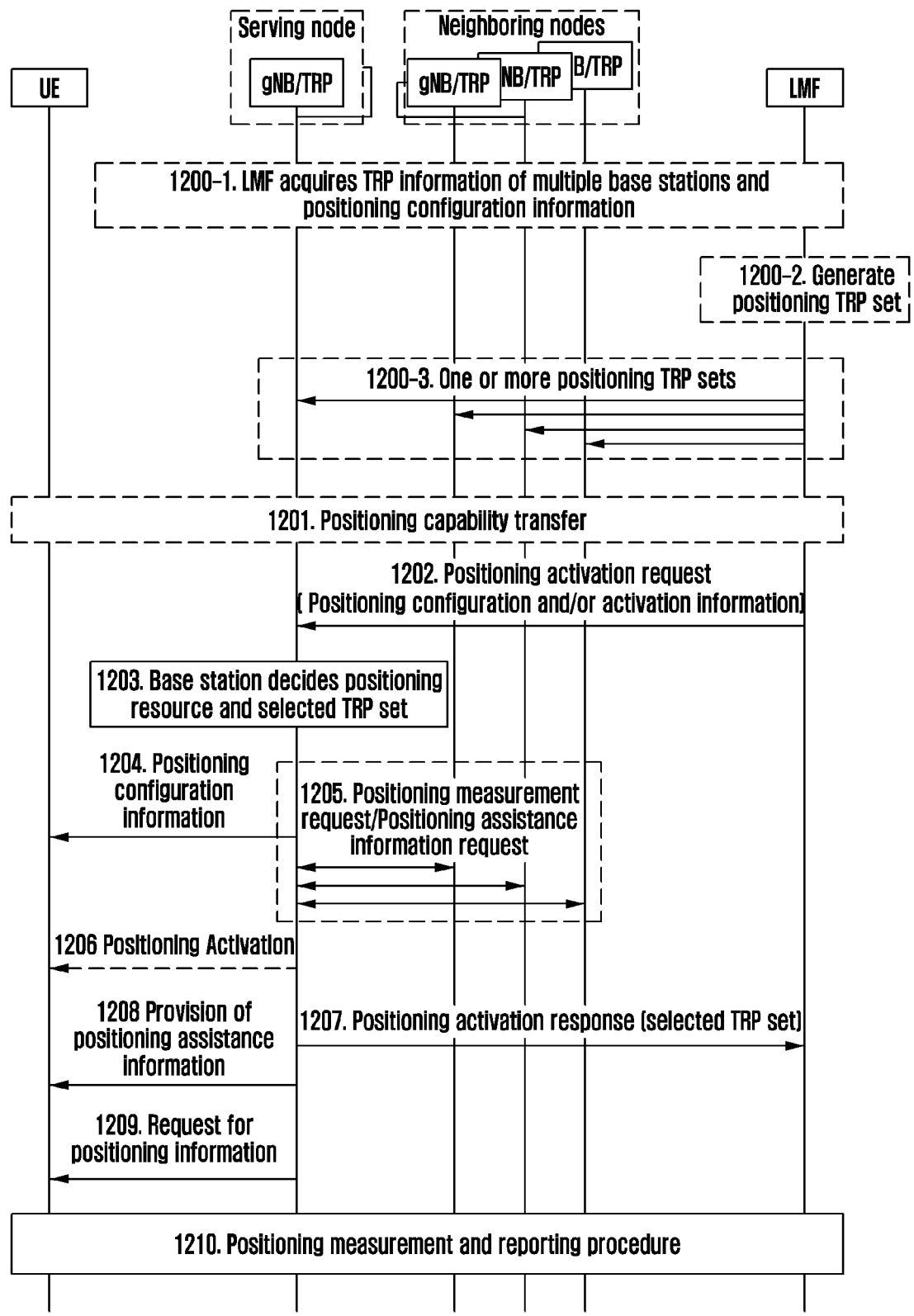
FIG. 12 illustrates a diagram of an Embodiment 1 of another positioning configuration method according to an embodiment of the present disclosure.

Embodiment 1 of another positioning configuration method of the present disclosure is shown in FIG. 12. A detailed description of steps irrelevant to the present disclosure is omitted here. The method includes the following steps.

In one example of Step 1200, before the positioning procedure starts, the serving node obtains information related to candidate positioning reference points, which may be a candidate positioning TRP set. The serving node and the neighboring nodes may be, for example, base stations. According to exemplary embodiments, step 1200 may include the following steps 1200-1, 1200-2, and 1200-3.

In one example of Step 1200-1, the LMF acquires, from the serving node and/or multiple neighboring nodes, TRP information and positioning configuration information corresponding to each TRP, such as the time-frequency resource position of a positioning reference signal (PRS).

In one example of Step 1200-2, the LMF generates one or more candidate positioning TRP sets according to the received TRP information and/or historical positioning TRP information, wherein each candidate positioning TRP set may include at least one of the following information:

Scope information, which is used to indicate a specific positioning scope, which may be coverage range, time range or positioning quality requirements. If the scope information is a coverage range, the range may be a cell coverage range, and the scope information may be Cell ID (such as CGI, ECGI, etc.); Or the scope information is a coverage range of SSB beam in a cell, and the scope information may be Cell ID (such as CGI, ECGI, etc.)+SSB beam index; Or the scope information is a position coordinate range. Although specific examples of scope information have been described, the present disclosure is not limited thereto; or TRP list indicating the TRPs involved in positioning, which includes one or more TRP information, and each TRP information includes at least one of the following information:
(1) gNB ID indicating the base station where the TRP is located;
(2) Cell ID indicating the cell where the TRP is located, which may be CGI or ECGI;
(3) TRP ID indicating a specific TRP under the base station; or
(4) Positioning assistance information indicating positioning assistance information on the TRP, such as information like configuration of the positioning reference signal.

In one example of Step 1200-3, the LMF transmits, to the serving node and the neighboring nodes, one or more TRP sets associated therewith, respectively. "Associated" means that the location area of TRP is the cell and/or cell coverage under the node.

The serving node and the neighboring nodes store the received TRP set or sets.

In one example of Step 1201, the UE exchange UE positioning capabilities with the LMF.

In one example of Step 1202, the LMF decides to position the UE, and LMF transmits a location configuration and activation request to the serving node where the UE is located, wherein the request includes location configuration (location method and/or measurement reporting method) and/or activation information. The request may include at least one of the following:

Uplink (UL) positioning method and reporting configuration;

Downlink (DL) positioning method and reporting configuration;

UL+DL positioning method and reporting configuration; or

Positioning activation time indicating specific time when the UE starts transmitting and/or receiving a positioning reference signal, which may be in the form of system frame number or time stamp.

Although specific examples of the positioning activation request have been described above, the present disclosure is not limited thereto.

In one example of Step 1203, the serving node receives the information and compares the information with the location area in the TRP set received in step 1200 according to the current location information of the UE (such as information of the cell where the UE is located and SSB beam). If the location of the UE is within the location area, the first node decides to use a TRP in the TRP list corresponding to the location area to position the UE.

In one example of Step 1204, if the UL positioning method and/or the UL+DL method are used, the first node transmits positioning configuration information to the UE, which may include at least one of the following:

Configuration information of UL positioning reference signal, indicating, to the UE, the transmission mode and time-frequency resource of uplink positioning reference signal;

DL positioning assistance information, indicating, to the UE, information on TRPs selected for downlink positioning and corresponding assistance information, wherein the assistance information may be configuration of the positioning reference signal transmitted on TRP, so that UE may receive and measure a downlink positioning reference signal; or Positioning activation time, indicating specific time when the UE starts transmitting and/or receiving a positioning reference signal, which may be in the form of system frame number or time stamp.

The information can be transmitted by an RRC reconfiguration message or an RRC release message.

In one example of Step 1205, the serving node transmits a positioning measurement request to neighboring nodes selected for positioning, wherein other nodes may be base stations, and other nodes are nodes corresponding to gNB ID or Cell ID in the TRP list in the selected TRP set. The positioning measurement request may include ID information for positioning measurement (such as an LMF ID and a transaction ID), TRP information for positioning measurement, signal configuration for positioning measurement (such as SRS configuration) and/or reporting method for positioning measurement. The neighboring nodes receive the information.

If the serving node does not obtain the TRP assistance information in step 1200, the serving node may transmit a request for positioning assistance information to the neighboring nodes, which may include a requested TRP ID and an assistance information request indication. The neighboring nodes receive the information and transmit the corresponding positioning service information.

In one example of Step 1206, if the positioning activation time is not included in step 1204, the serving node may transmit the positioning activation to the UE, to indicate, to the UE, to start transmitting the uplink positioning signal.

In one example of Step 1207, the serving node transmits a positioning activation response to the LMF, where the response includes the TRP set selected in step 1203, so that after receiving the measurement report, the LMF calculates a location of the UE in connection with the information.

In one example of Step 1208, if the positioning method includes DL positioning method and/or UL+DL positioning method, the serving node provides to the UE positioning assistance information related to downlink positioning measurement, which can be obtained in step 1200 or step 1205.

In one example of Step 1209, if the positioning method includes DL positioning method and/or UL+DL positioning method, the serving node transmits request positioning information to the UE, wherein the information includes a request for measuring positioning measurement related to downlink positioning. The information is obtained in step 1202.

After receiving the information, the UE may start downlink related positioning measurement according to the configuration and report the measurement result according to the configuration.

In one example of Step 1210, the UE and/or the nodes selected for positioning measurement report the measurement result according to the reporting configuration.

The LMF calculates the location of the UE according to the measurement result and the location information of TRPs involved in positioning.

In this way, the node serving the UE may obtain the alternative positioning TRP scheme and/or auxiliary information in advance, and at the beginning of positioning, the TRP selected for the positioning is directly determined according to the current location information of the UE, and there is no need to exchange positioning information with the LMF. After the beginning of positioning, both downlink positioning and uplink positioning are directly activated by the serving node, which reduces the delay of positioning and the load of signaling exchange.

So far, the description of Embodiment 1 of another positioning configuration method of the present disclosure has been made. By this method, the node serving the UE can obtain the positioning-related assistance information before the beginning of the positioning procedure, and the positioning procedure is directly activated by the serving node, thus reducing the delay of positioning, accelerating the positioning procedure, reducing the extra signaling overhead, and completing the positioning procedure more quickly under a more energy-saving scheme.

Figure 13:
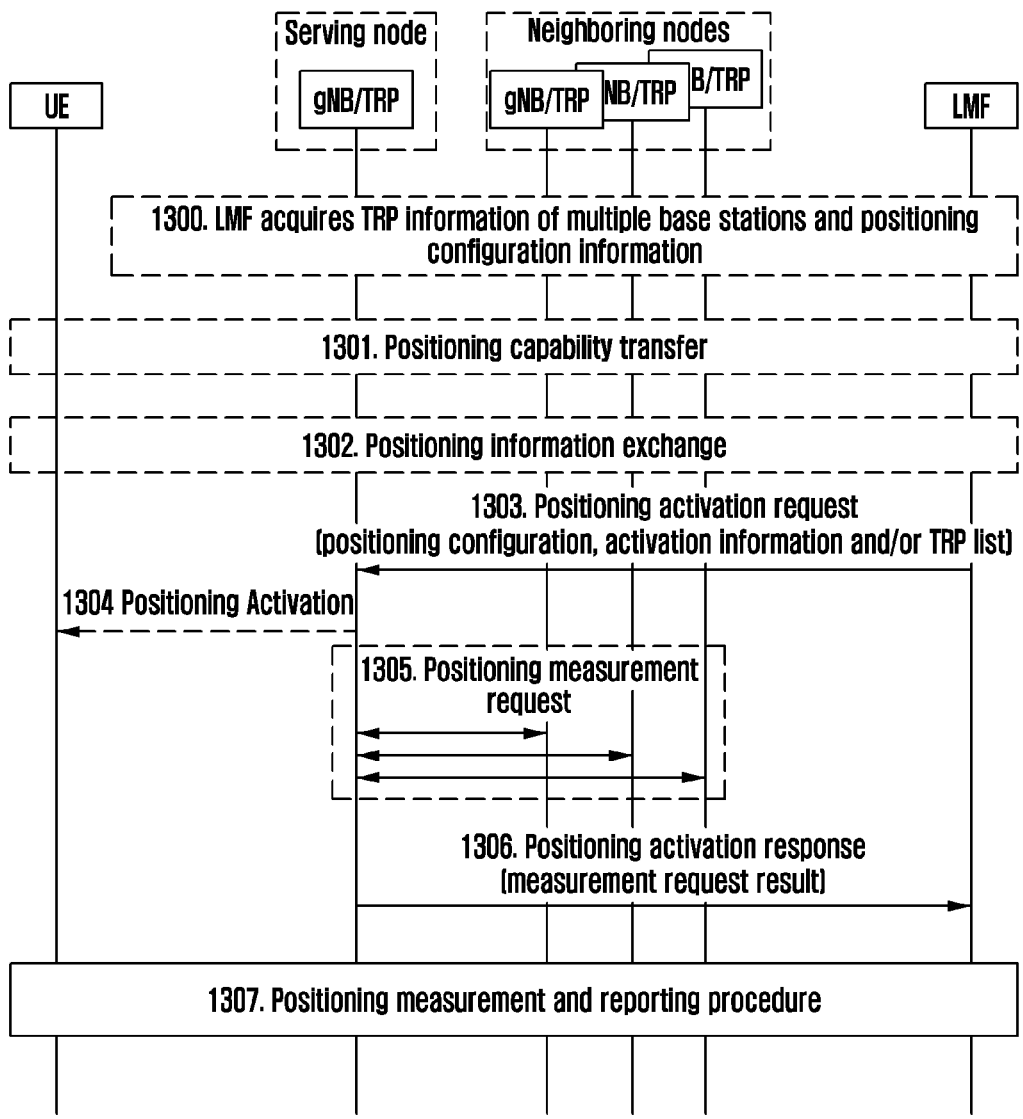
FIG. 13 illustrates a diagram of an Embodiment 2 of another positioning configuration method according to an embodiment of the present disclosure.

Embodiment 2 of another positioning configuration method of the present disclosure is shown in FIG. 13. A detailed description of steps irrelevant to the present disclosure is omitted here. The method includes the following steps.

In one example of Step 1300, the LMF acquires, from a serving node and/or multiple neighboring nodes, TRP information and positioning configuration information corresponding to each TRP, such as the time-frequency resource position of PRS.

In one example of Step 1301, the UE exchange UE positioning capabilities with the LMF.

In one example of Step 1302, the UE exchanges positioning information with the LMF, which refers to a positioning signal configuration allocated by the serving node, such as SRS configuration information and/or SFN Initialization Time. Using step 1302, the UE and the LMF acquire the information.

In one example of Step 1303, the LMF transmits a location activation request to the serving node, wherein the request may include at least one of the following:

Positioning configuration, which includes information such as a positioning method, a positioning signal configuration and the like;

Activation information which is used to indicate transmission time of the positioning signal, which may include a type of the positioning signal and/or activation time; or TRP set, which may contain one or more TRP lists, indicating TRP information involved in positioning, and each TRP list may also include at least one of the following:
  (1) gNB ID indicating the base station where the TRP is located;
  (2) Cell ID indicating the cell where the TRP is located, which may be CGI or ECGI;
  (3) TRP ID indicating a specific TRP under the base station; or
  (4) Positioning assistance information indicating positioning assistance information on the TRP, such as information like configuration of the positioning reference signal.

In one example of Step 1304, the serving node transmits positioning activation to the UE according to the positioning activation configuration, and according to the positioning activation, the UE starts transmitting uplink positioning signals and/or measuring downlink positioning signals.

In one example of Step 1305, the serving node transmits a positioning measurement request to the neighboring nodes selected for positioning, where other nodes can be base stations, and other nodes are nodes corresponding to gNB ID or Cell ID in the TRP list in the selected TRP set. The positioning measurement request may include at least one of that following:

- ID information for positioning measurement (such as an LMF ID and a transaction ID), which is used to indicate, to the neighboring nodes, which positioning measurement procedure initiated by which LMF the positioning measurement request belongs to;
- TRP information for positioning measurement, which is used to indicate which TRPs under the neighboring nodes need to participate in the positioning measurement, and may include ID information of TRPs;
- Signal configuration for positioning measurement (such as SRS configuration), which is used to indicate how the TRP that needs to participate in positioning receives and measures the uplink positioning signal; or
- Reporting mode for positioning measurement, which is used to indicate, to the neighboring nodes, how to report positioning measurement results.

The neighboring nodes receive and apply the information, and send back whether the positioning measurement is successful or not to the serving node or the LMF.

In one example of Step 1306, the serving node transmits a positioning activation response to the LMF, wherein the response includes a result of whether the positioning measurement request is successful or not, so that after receiving the measurement report, the LMF calculates a location of the UE in connection with the information.

In one example of Step 1307, The neighboring nodes and/or the serving node perform positioning measurement according to the configuration and report the positioning measurement result to the LMF, and the UE performs positioning measurement according to the configuration and reports the measurement result.

The LMF calculates the location of the UE according to the measurement result and the TRP location information involved in positioning.

In this way, the node serving the UE can directly transmit the positioning measurement request to the neighboring nodes selected for the positioning, thus avoiding the repeated transmission of positioning signal configuration information and reducing the delay of positioning and the load of signaling exchange.

So far, the description of Embodiment 2 of another positioning configuration method of the present disclosure has been made. By this method, the node serving the UE can directly transmit the positioning related information to the neighboring nodes selected for the positioning without going through the LMF, thus reducing the delay of positioning, accelerating the positioning procedure, reducing the extra signaling overhead, and completing the positioning procedure more quickly under a more energy-saving scheme.

Figure 14:
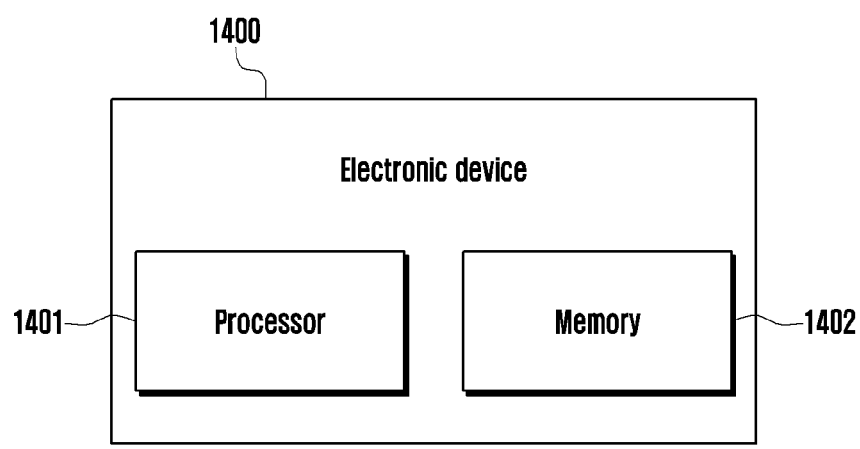
FIG. 14 illustrates a block diagram of an electronic device according to an embodiment of the present disclosure.

FIG. 14 illustrates a block diagram of an electronic device according to an embodiment of the present disclosure. The electronic equipment can also be called wireless communication device, and can be any device in the wireless communication system, such as a user equipment, a base station, a core network, etc. As shown in FIG. 14, the electronic device 1400 includes a processor 1401 and a memory 1402. Under the control of the processor 1401 (which can be implemented as one or more processors), the electronic device 1400 can be configured to perform related operations performed by each electronic device in any of the methods described above. Although the processor 1401 and the memory 1402 are shown as separate entities, they can be implemented as a single entity, such as a single chip. The processor 1401 and the memory 1402 may be electrically connected or coupled to each other. The processor 1402 may be configured to execute instructions (including computer programs) stored in the memory 1402 to control the overall operation of the electronic device 1400, thereby realizing the operations in the flow of the above method.

Those skilled in the art can realize that the present disclosure can be realized in other specific forms without changing the technical idea or essential features of the present disclosure. Therefore, it should be understood that the above embodiments are only examples and are not limited. The scope of the present disclosure is defined by the appended claims, not by the detailed description. Therefore, it should be understood that all modifications or changes derived from the meaning and scope of the appended claims and their equivalents are within the scope of this disclosure.

In the above embodiments of the present disclosure, all operations and messages may be selectively performed or may be omitted. In addition, the operations in each embodiment need not be performed sequentially, and the order of the operations can be changed. Messages do not need to be transmitted in order, and the transmission order of messages may change. Each operation and each message transmission can be performed independently.

Although the present disclosure has been shown and described with reference to various embodiments thereof, those skilled in the art will understand that various changes in form and details can be made therein without departing from the spirit and scope of the present disclosure as defined by the appended claims and their equivalents.

What is claimed is:

1. A method performed by a first base station in a wireless communication system, the method comprising:
   - receiving a retrieve user equipment (UE) context request message from a second base station where a UE in an inactive state moved from the first base station; and
   - transmitting, to the second base station, a retrieve UE context response message as a response to the retrieve UE context request message,
   - wherein the retrieve UE context request message includes an identifier (ID) of the UE,
   - wherein the retrieve UE context response message includes positioning information for the UE including requested sounding reference signal (SRS) transmission characteristics, a routing ID corresponding to a location management node, and a new radio positioning protocol A (NRPPa) transaction ID, and
   - wherein the requested SRS transmission characteristics include a frequency resource for a SRS and a periodicity of the SRS.

2. The method of claim 1, further comprising:
   - transmitting, from a central unit (CU) to a distributed unit (DU), a message including a SRS configuration for positioning; and
   - based on the UE entering into the inactive state, transmitting, from the CU to the DU, a UE context release command message including information indicating a reservation of a positioning related configuration,
   - wherein, in case that the information indicating the reservation of the positioning related configuration is included in the UE context release command message, the SRS configuration for positioning is not released for the UE in the inactive state, and
   - wherein the CU and the DU are included in the first base station.

3. The method of claim 1, wherein the retrieve UE context request message further includes information on a cause indicating that a resumption of a radio resource control (RRC) connection initiated by the UE is for an SRS based positioning in the inactive state.

4. A first base station in a wireless communication system, the first base station comprising:
   a memory;
   a transceiver; and
   a processor coupled with the memory and the transceiver, the processor configured to:
   receive a retrieve user equipment (UE) context request message from a second base station where a UE in an inactive state moved from the first base station, and
   transmit, to the second base station, a retrieve UE context response message as a response to the retrieve UE context request message,
   wherein the retrieve UE context request message includes an identifier (ID) of the UE,
   wherein the retrieve UE context response message includes positioning information for the UE including requested sounding reference signal (SRS) transmission characteristics, a routing ID corresponding to a location management node, and a new radio positioning protocol A (NRPPa) transaction ID, and
   wherein the requested SRS transmission characteristics include a frequency resource for a SRS and a periodicity of the SRS.

5. The first base station of the claim 4, wherein the processor is further configured to:
   transmit, from a central unit (CU) to a distributed unit (DU) via the transceiver, a message including a sounding reference signal (SRS) configuration for positioning, and
   based on the UE entering into the inactive state, transmit, from the CU to the DU, a UE context release command message including information indicating a reservation of a positioning related configuration,
   wherein, in case that the information indicating the reservation of the positioning related configuration is included in the UE context release command message, the SRS configuration for positioning is not released for the UE in the inactive state, and
   wherein the CU and the DU are included in the first base station.

6. A method performed by a second base station in a wireless communication system, the method comprising:
   receiving, from a user equipment (UE) in an inactive state, a radio resource control (RRC) resume request message;
   transmitting, to a first base station, a retrieve UE context request message, based on the UE moving from the first base station to the second base station; and
   receiving, from the first base station, a retrieve UE context response message as a response to the retrieve UE context request message,
   wherein the retrieve UE context request message includes an identifier (ID) of the UE,
   wherein the retrieve UE context response message includes positioning information for the UE including requested sounding reference signal (SRS) transmission characteristics, a routing ID corresponding to a location management node, and a new radio positioning protocol A (NRPPa) transaction ID, and
   wherein the requested SRS transmission characteristics include a frequency resource for a SRS and a periodicity of the SRS.

7. A second base station in a wireless communication system, the second base station comprising:
   a transceiver; and
   a processor configured to:
   receive, from a user equipment (UE) in an inactive state, a radio resource control (RRC) resume request message,
   transmit, to a first base station, a retrieve UE context request message, based on the UE moving from the first base station to the second base station, and
   receive, from the first base station, a retrieve UE context response message as a response to the retrieve UE context request message,
   wherein the retrieve UE context request message includes an identifier (ID) of the UE,
   wherein the retrieve UE context response message includes positioning information for the UE including requested sounding reference signal (SRS) transmission characteristics, a routing ID corresponding to a location management node, and a new radio positioning protocol A (NRPPa) transaction ID, and
   wherein the requested SRS transmission characteristics include a frequency resource for a SRS and a periodicity of the SRS.

\* \* \* \* \*